United States Patent
Suzuki et al.

(10) Patent No.: US 11,840,757 B2
(45) Date of Patent: Dec. 12, 2023

(54) FILM DEPOSITION SYSTEM, FACTORY SYSTEM, AND METHOD OF DEPOSITING FILM ON WAFER

(71) Applicant: TDK CORPORATION, Tokyo (JP)

(72) Inventors: Tsuyoshi Suzuki, Tokyo (JP); Katsuyuki Nakada, Tokyo (JP); Tomoyuki Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 15 days.

(21) Appl. No.: 17/348,238

(22) Filed: Jun. 15, 2021

(65) Prior Publication Data

US 2022/0010423 A1 Jan. 13, 2022

(30) Foreign Application Priority Data

Jul. 8, 2020 (WO) ................. PCT/JP2020/026641
Mar. 9, 2021 (JP) ................................ 2021-037581

(51) Int. Cl.
*C23C 14/54* (2006.01)
*C23C 16/52* (2006.01)
*G06F 30/27* (2020.01)
*C23C 14/34* (2006.01)
*G06F 111/10* (2020.01)

(52) U.S. Cl.
CPC .............. *C23C 14/54* (2013.01); *C23C 14/34* (2013.01); *C23C 16/52* (2013.01); *G06F 30/27* (2020.01); *G06F 2111/10* (2020.01)

(58) Field of Classification Search
CPC ......... C23C 14/54; C23C 14/34; C23C 16/52; C23C 14/568; C23C 16/54; G06F 30/27; G06F 2111/10; G06F 30/20; G06F 2111/08

See application file for complete search history.

(56) References Cited

U.S. PATENT DOCUMENTS

2016/0030909 A1* 2/2016 Detavernier .......... C23C 14/505
 506/40
2020/0065657 A1 2/2020 Uchigaito
2020/0377997 A1* 12/2020 Trinh ..................... C23C 14/35
(Continued)

FOREIGN PATENT DOCUMENTS

JP 2012-242888 A 12/2012
JP 5650760 B2 1/2015
JP 2019-101683 A 6/2019
(Continued)

OTHER PUBLICATIONS

WO-2017037902-A1 Translation (Year: 2017).*
Apr. 29, 2023 Office Action issued in Chinese Patent Application No. 202110761104.4.

*Primary Examiner* — Jennifer Wecker
*Assistant Examiner* — Patrick S Ott
(74) *Attorney, Agent, or Firm* — Oliff PLC

(57) ABSTRACT

A film deposition system according to the present embodiment includes a film deposition apparatus, and a computer, in which the film deposition apparatus includes a film deposition chamber in which a plurality of deposition species are installable, and the computer includes a calculation region that calculates based on a calculation model having an Ising model or QUBO, and predict a time required for film deposition when a disposition of the deposition species is set.

14 Claims, 17 Drawing Sheets

(56) References Cited

U.S. PATENT DOCUMENTS

2021/0073610 A1\*  3/2021  Kuriki ...................... G06N 3/08
2022/0171373 A1\*  6/2022  Chau ................. H01J 37/32926

FOREIGN PATENT DOCUMENTS

| JP | 2020-035000 A | 3/2020 | |
| WO | 2010/116547 A1 | 10/2010 | |
| WO | 2017/037902 A1 | 3/2017 | |
| WO | WO-2017037902 A1 \* | 3/2017 | ............. G06F 15/80 |

\* cited by examiner

FIG. 4

| deposition species | ch A | ch B |
|---|---|---|
| a | 1 | 0 |
| b | 0 | 1 |
| c | 1 | 0 |
| d | 1 | 0 |
| e | 0 | 1 |
| f | 1 | 0 |

X

| $N_{slot}$ | ch A | ch B |
|---|---|---|
| 0 | 0 | 0 |
| 1 | 0 | 0 |
| 2 | 0 | 1 |
| 3 | 0 | 0 |
| 4 | 1 | 0 |
| 5 | 0 | 0 |
| 6 | 0 | 0 |
| 7 | 0 | 0 |
| 8 | 0 | 0 |

Y

FILM DEPOSITION SYSTEM, FACTORY SYSTEM, AND METHOD OF DEPOSITING FILM ON WAFER

CROSS-REFERENCE TO RELATED APPLICATION

This application is based upon and claims the benefit of priority from PCT Patent Application PCT/JP2020/026641, Jul. 8, 2020 and Japanese Patent Application No. 2021-037581, Mar. 9, 2021; the entire contents of which are incorporated herein by reference.

BACKGROUND

Field

The present invention relates to a film deposition system, a factory system, and a method of depositing a film on a wafer.

Description of Related Art

A film deposition apparatus for depositing a multilayer film on a wafer is known (for example, Patent Document 1).

PATENT DOCUMENTS

[Patent Document 1] Japanese Patent No. 5650760

SUMMARY OF THE INVENTION

A film deposition apparatus includes a plurality of deposition species to deposit each layer constituting a multilayer film. The deposition species may be, for example, raw materials used when a multilayer film is laminated, and may be, for example, target materials used in a sputtering method. The film deposition apparatus transfers a wafer to a position facing a predetermined deposition species to perform film deposition for each layer to be deposited. A thickness required for each layer is different, and a film deposition rate is different for each deposition species. Therefore, a time required for film deposition differs for each layer, and film deposition of a specific layer may be a rate-limiting factor for a throughput. When a disposition of deposition species in the film deposition apparatus is changed, a wafer may be inhibited from being in a film deposition standby state, a transfer time may be reduced, and a throughput may be improved.

As the number of layers of a multilayer film increases, the number of deposition species increases, and the number of disposition combinations of the deposition species becomes innumerable. So far, setting of a disposition of deposition species has often been based on experience of an operator. However, further improvement in throughput is required.

The present invention has been made in view of the above-described circumstances, and an objective of the present invention is to provide a film deposition system, a factory system, and a method of depositing a film on a wafer in which a time required for film deposition can be reduced.

The present invention provides the following methods to solve the above-described problems.

(1) A film deposition system according to a first aspect includes a film deposition apparatus, and a computer, in which the film deposition apparatus includes a film deposition chamber in which a plurality of deposition species are installable, and the computer includes a calculation region that calculates based on a calculation model having an Ising model or quadratic unconstrained binary optimization (QUBO), and predicts a time required for film deposition when a disposition of the deposition species is set.

(2) In the film deposition system according to the above-described aspect, the Ising model or the QUBO may have elements of a number corresponding to a product of the number of the deposition species and the number of the film deposition chambers, and each of the elements may be a binary variable.

(3) In the film deposition system according to the above-described aspect, an energy function of the Ising model or the QUBO may indicates a value corresponding to a throughput of the film deposition apparatus.

(4) In the film deposition system according to the above-described aspect, the Ising model or the QUBO may has elements interact with each other due to an interaction parameter, the interaction parameter is determined from values corresponding to a transfer time of a wafer to be deposited and a processing time in each process.

(5) In the film deposition system according to the above-described aspect, the Ising model or the QUBO may be defined on a condition whether processing in any one process can be replaced by processing in another chamber.

(6) In the film deposition system according to the above-described aspect, the film deposition apparatus may further include a process chamber which performs a process other than film deposition, and processing in the process chamber may be defined as a process that is not replaceable with processing in another chamber in the Ising model or the QUBO.

(7) In the film deposition system according to the above-described aspect, the Ising model or the QUBO may have a constraint, and the constraint may reflect an upper limit of the number of deposition species of the same type among the deposition species.

(8) In the film deposition system according to the above-described aspect, the Ising model or the QUBO may have a constraint, and the constraint may reflect an upper limit of the number of slots of the deposition species in the film deposition chamber.

(9) In the film deposition system according to the above-described aspect, the Ising model or the QUBO may further have additional elements of a number corresponding to a sum of the number of slots in the film deposition chamber as the constraint, and the additional elements may be binary variables.

(10) In the film deposition system according to the above-described aspect, the Ising model or the QUBO may have a constraint, and the constraint may reflect a condition that deposition species that have a chance of being deposited simultaneously on a wafer are disposed in the same film deposition chamber.

(11) In the film deposition system according to the above-described aspect, the Ising model or the QUBO may have a constraint, and the constraint may reflect a condition that times until the plurality of deposition species will reach the end of their service lives are substantially the same.

(12) In the film deposition system according to the above-described aspect, the Ising model or the QUBO may have a constraint, and the Ising model or the QUBO may further have an additional element representing a process cycle and a processing time for a process of a wafer as the constraint, and the additional element may be a binary variable.

(13) In the film deposition system according to the above-described aspect, the Ising model or the QUBO may have a constraint, and the Ising model or the QUBO may further have an additional element representing a loading time of a wafer to be loaded as the constraint, and the additional element may be a binary variable.

(14) In the film deposition system according to the above-described aspect, the computer may further include a storage region which stores a disposition of specific deposition species and a time required for film deposition in a case of the disposition of the specific deposition species as teacher data, and a learning region which determines an interaction parameter between elements of the Ising model or the QUBO by machine learning which is based on the teacher data and designs a calculation model.

(15) In the film deposition system according to the above-described aspect, the storage region may reacquire a disposition of the deposition species used for prediction in the calculation region and a time required for the film deposition predicted in the calculation region as the teacher data.

(16) In the film deposition system according to the above-described aspect, the machine learning may be performed by a factorization machine.

(17) A factory system according to a second aspect includes a plurality of apparatuses, and a computer, in which the computer includes a calculation region that calculates based on a calculation model having an Ising model or quadratic unconstrained binary optimization (QUBO), and predicts a time required for processing when the plurality of apparatuses are disposed in a plurality of regions in which the apparatuses are installable.

(18) In the factory system according to the above-described aspect, the computer may further include a storage region which stores a disposition of the apparatuses with respect to the regions and a time required for processing in a case of the disposition as teacher data, and a learning region which determines an interaction parameter between elements of the Ising model or the QUBO by machine learning which is based on the teacher data and designs a calculation model.

(19) A method of depositing a film on a wafer according to a third aspect includes a process of designing a calculation model having an Ising model or quadratic unconstrained binary optimization (QUBO) with a disposition of a plurality of deposition species in a film deposition apparatus as an element, a process of predicting a time required for film deposition when the deposition species are disposed on the basis of the calculation model, and a process of applying the disposition of the deposition species as a disposition of the deposition species of the film deposition apparatus when the predicted time is equal to or less than a predetermined time.

(20) In the method of depositing a film on a wafer according to the above-described aspect, the process of designing a calculation model may include a process of acquiring a disposition of specific deposition species and a time required for film deposition in a case of the disposition of the specific deposition species as teacher data, and a process of determining an interaction parameter between elements by machine learning which is based on the teacher data.

(21) The method of depositing a film on a wafer according to the above-described aspect may further include a process of reacquiring a disposition of the deposition species and a time required for film deposition at the time of the disposition of the deposition species when a time predicted on the basis of the calculation model is equal to or more than a predetermined time.

The film deposition system, the factory system, and the method of depositing a film on a wafer according to the present invention can reduce a time required for film deposition.

BRIEF DESCRIPTION OF THE DRAWINGS

FIG. 4 is an example of a state in which an additional element of reflecting a disposition of deposition species in a film deposition chamber in a calculation model is added as a constraint.

DETAILED DESCRIPTION OF THE INVENTION

Figure 1:
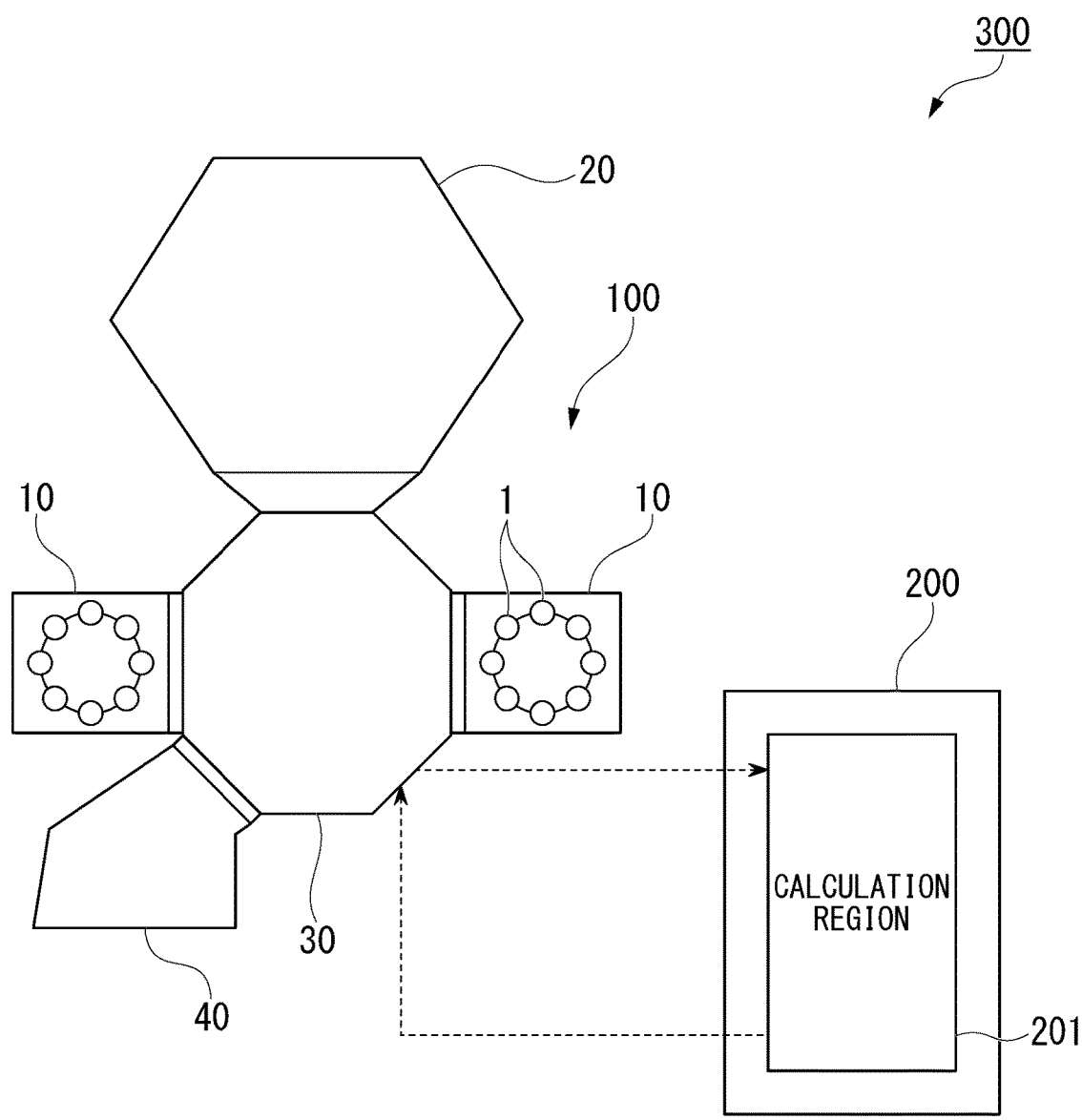
FIG. 1 is a schematic view of a film deposition system according to a first embodiment.

Hereinafter, the present embodiment will be described in detail with reference to the drawings as appropriate. In the drawings used in the following description, there are cases in which characteristic portions are appropriately enlarged for convenience of illustration so that characteristics of the present embodiment can be easily understood, and dimensional proportions of respective constituent elements may be different from actual ones. Materials, dimensions, and the like illustrated in the following description are merely examples, and the present invention is not limited thereto and can be implemented with appropriate modifications within a range not changing the gist of the present invention.

First Embodiment

FIG. 1 is a schematic view of a film deposition system 300 according to a first embodiment. The film deposition system 300 includes a film deposition apparatus 100 and a computer 200.

The film deposition apparatus 100 may include, for example, a plurality of film deposition chambers 10, a process chamber 20, a transfer chamber 30, and a load lock chamber 40.

The film deposition apparatus 100 may be, for example, a film deposition apparatus employing a single-wafer-processing type which is a method for processing wafers one at a time, or the like. The film deposition apparatus 100 is a film deposition apparatus using a sputtering method, a film deposition apparatus using a chemical vapor deposition method, or the like.

The film deposition chamber 10 is a chamber for performing film deposition on a wafer. For example, a plurality of deposition species 1 can be installed in one film deposition chamber 10. The film deposition chambers 10 illustrated in FIG. 1 each have eight deposition species 1. One film deposition chamber 10 can deposit a plurality of layers by having the plurality of deposition species 1. Each film deposition chamber 10 may have deposition species different from each other or may have a plurality of deposition species made of a material that is frequently used.

The process chamber 20 is a chamber for performing a process other than film deposition. The "process other than film deposition" may be, for example, a heating or cooling treatment for a substrate, a partial peeling treatment for a deposited film, or a chemical reaction treatment such as oxidation or the like. The transfer chamber 30 is a chamber for transferring a wafer between chambers. The load lock chamber 40 is a chamber that connects the outside and a vacuum region and is also called a vacuum auxiliary chamber in some cases. For example, a wafer that has entered the transfer chamber 30 from the load lock chamber 40 may be transferred to any one of the film deposition chambers 10 and the process chamber 20 in a process sequence.

The computer 200 determines a disposition of the deposition species 1 of the film deposition apparatus 100. The "disposition of the deposition species 1" refers to which deposition species 1 is disposed in which chamber. The computer 200 may determine an order of wafer transfer in the film deposition apparatus 100 and a timing of loading a wafer into the film deposition apparatus 100.

The computer 200 has a calculation region 201. The calculation region 201 has a calculation model based on an Ising model or quadratic unconstrained binary optimization (QUBO). The calculation region 201 predicts a time required for film deposition when the deposition species 1 are disposed in a specific disposition. A disposition of the deposition species 1 can be determined on the basis of a calculation result of the computer 200.

Figures 2, 3:
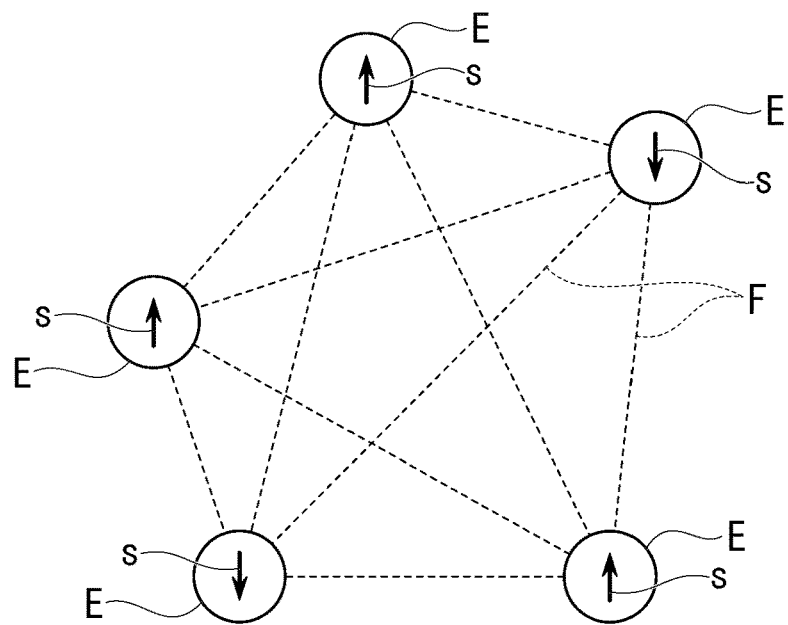
FIG. 2 is an image diagram of an Ising model and QUBO.
FIG. 3 shows an example in which a disposition of deposition species in a film deposition chamber is reflected in a state of elements in a calculation model.

The Ising model is a model that predicts a state in which the whole is stable when a plurality of elements interact with each other and a force is given to each element. FIG. 2 is an image diagram of the Ising model. The Ising model has a plurality of elements E that interact with each other due to a force F. Each of the elements E consists of a spin s. The spin s has either an upward or downward state. The element E is represented by a binary variable. According to setting of the force F, adjacent spins s in equilibrium state become a stable state, or those in antiparallel state become a stable state. The force F is called an interaction parameter.

The Ising model is represented as the following energy function (cost function).

$$H = \sum_{i \neq j} J_{ij}\sigma_i\sigma_j + \sum_i h_i\sigma_i \qquad \text{[Math. 1]}$$

Here, $\sigma_i$ and $\sigma_j$ are input variables and are +1 or −1. $\sigma_i$ and $\sigma_j$ correspond to a state of the spin s in FIG. 2. $J_{ij}$ is an interaction parameter. $J_{ij}$ corresponds to the force F in FIG. 2. $h_i$ is a parameter associated with an external factor.

Quadratic unconstrained binary optimization (QUBO) is a calculation model that can be equivalently converted into the Ising model. The QUBO can be applied to a calculation model in the same manner as the Ising model. The QUBO is represented as the following energy function (cost function).

$$H = \sum_{i,j} Q_{ij} q_i q_j \qquad \text{[Math. 2]}$$

Here, $q_i$ and $q_j$ are input variables and are 1 or 0. $q_i$ and $q_j$ correspond to a state of the spin s in the Ising model. $Q_{ij}$ is an interaction parameter in the QUBO. The $Q_{ij}$ corresponds to the force F in the Ising model.

Hereinafter, a design method of a calculation model will be described by taking a case of applying the QUBO as an example. The QUBO can be equivalently converted into the Ising model, and even when the Ising model is applied, it can be performed in the same manner as in the case of the QUBO.

A disposition of the deposition species 1 is converted into a state ($q_i$, $q_j$) of the spin s in the element E of the QUBO. Specifically, first, elements $E_j$) of a number corresponding to a product of the number of deposition species $N_{seed}$ and the number of chambers $N_{ch}$ are prepared. A state $x_{i,j}$ of each element E ($X_{i,j}$) is defined as "1" when a j-th deposition species is disposed in an i-th chamber and is defined as "0" in other cases.

FIG. 3 is an example of a state when a disposition of the deposition species 1 is applied to the element E. In the example of FIG. 3, there are deposition species a to f. The deposition species a to f are disposed in chambers A and B. The deposition species a, c, d, and f are disposed in the first chamber A, and the deposition species b and e are disposed in the second chamber B. When this state is applied to the element E, the number of the elements E is 12, which is a product of 6 which is the number of deposition species and 2 which is the number of chambers. A first, a third, a fourth, and a sixth of the first chamber A in which the deposition species are disposed are each "1," and a second and a fifth of the second chamber B are each "1." An expression of the energy function of QUBO is as follows.

$$H_t = \sum_{i'}^{N_{ch}} \sum_{j'}^{N_{seed}} \sum_{i}^{N_{ch}} \sum_{j}^{N_{seed}} Q_{N_{ch} \cdot j+i, N_{ch} \cdot j'+i'} x_{i,j} x_{i',j'} \qquad \text{[Math. 3]}$$

$H_t$ indicates a value corresponding to a time (throughput) required for film deposition. An interaction parameter Q (force F) of the QUBO is defined, for example, as follows.

The time (throughput) $H_t$ required for film deposition is represented as the following expression.

$$H_t = \sum_{i=1}^{N_{stack}} h_t(i) \qquad \text{[Math. 4]}$$

$N_{stack}$ is a total number of process cycles in the film deposition apparatus. $H_t$ is represented by following processes in the film deposition apparatus in sequence.

$h_t$ is represented by the following four cases according to types of an i-th process and an i−1-th process.

When both the i-th process and the i−1-th process are film deposition with a deposition species in which a chamber to be disposed can be changed, $h_t$ is represented as the following expression. The "chamber to be disposed can be changed" means a case in which a position at which a deposition species is disposed is not determined in a specific chamber but the deposition species can be disposed in another chamber.

$$h_t(i) = \sum_{j=0}^{N_{ch}} \sum_{k=0}^{N_{ch}} \left( t\_deliver_{j,k} + t\_process_{stack_i} \right) \cdot \qquad \text{[Math. 5]}$$
$$x_{j,seed(stack_{i-1})} \cdot x_{k,seed(stack_i)}$$

Here, $t\_deliver_{j,k}$ is a transfer time from a j-th chamber to a k-th chamber, and $t\_process_{stacki}$ is a processing time of the i-th process. These times can be obtained by, for example, actual measurement or simulation.

When the i-th process is film deposition with a deposition species in which a chamber to be disposed can be changed, and the i−1-th process is film deposition with a deposition species in which a chamber to be disposed cannot be changed (for example, the deposition species is fixed in a certain chamber) or is processing in the process chamber 20 that performs a process other than film deposition, $h_t$ is represented as the following expression.

$$h_t(i) = \sum_{k=0}^{N_{ch}} \left( t_{deliver_{ch(stack_{i-1}),k}} + t\_process_{stack_i} \right) \cdot x_{k,seed(stack_i)} \qquad \text{[Math. 6]}$$

When the i-th process is film deposition with a deposition species in which a chamber to be disposed cannot be changed (for example, the deposition species is fixed in a certain chamber) or is processing in the process chamber 20 that performs a process other than film deposition, and the i−1-th process is film deposition with a deposition species in which a chamber to be disposed can be changed, $h_t$ is represented as the following expression.

$$h_t(i) = \sum_{j=0}^{N_{ch}} \left( t\_deliver_{j,ch(stack_i)} + t\_process_{stack_i} \right) \cdot x_{j,seed(stack_{i-1})} \qquad \text{[Math. 7]}$$

When both the i-th process and the i−1-th process are film deposition with a deposition species in which a chamber to be disposed cannot be changed (for example, the deposition species are fixed in a certain chamber) or are processing in the process chamber 20 that performs a process other than film deposition, $h_1$ is represented as the following expression.

$$h_t(i) = t\_deliver_{ch(stack_{i-1}),ch(stack_i)} + t\_process_{stack_i} \qquad \text{[Math. 8]}$$

Constraints may be added to the energy function according to various constraint conditions in film deposition. The constraints may be set so that, for example, an energy in a state of an element of the QUBO corresponding to a pattern that does not satisfy the constraint conditions increases. Constraints do not necessarily have to be set, but a processing speed and accuracy of the calculation will increase when constraints are set.

For example, when there is only one deposition species made of a specific material and it is not permitted to load deposition species made of the same material into a plurality of chambers, a total number of deposition species that can be disposed in each chamber at the same time is 1. This condition is applied to each deposition species. That is, in FIG. 3, when the deposition species a is disposed in the chamber A, the deposition species a cannot be disposed in the chamber B. In order to express this constraint condition, the constraint as below may be added.

$$H_A = \lambda \sum_{j}^{N_{seed}} \left( 1 - \sum_{i}^{N_{ch}} x_{i,j} \right)^2 \qquad \text{[Math. 9]}$$

When the number of chambers in which the j-th deposition species is disposed is exactly 1, $H_A$ is 0. On the other hand, in other cases, $H_A$ has a value larger than 0 and acts to be in a state of high energy in the energy function of the QUBO. $\lambda$, is a coefficient and is a value larger than 0. An absolute value of $\lambda$, is adjusted according to a value desired to be optimized.

For example, the number of the deposition species 1 is eight in each of the film deposition chambers 10 illustrated in FIG. 1. In other words, eight or more deposition species 1 cannot be set in each of the film deposition chambers 10.

In order to express the above-described constraint condition, first, an additional element ($Y_{i,k}$) corresponding to a total number of the deposition species 1 (the number of slots) that can be disposed in each chamber is added. A state of $Y_{i,k}$ is "1" when k deposition species are disposed in the i-th chamber and is "0" when other than this case. FIG. 4 is an example of a state in which the additional element ($Y_{i,k}$) is added. The state of $Y_{i,k}$ illustrated in FIG. 4 indicate that four deposition species are disposed in the first chamber A and two deposition species are disposed in the second chamber B. A limitation of the disposition of the deposition species 1 due to an upper limit of the number of slots in each chamber can be represented by the following constraint.

$$H_B = \qquad \text{[Math. 10]}$$
$$\lambda \sum_{i}^{N_{ch}} \left( 1 - \sum_{k}^{N_{slot,i}} y_{i,k} \right)^2 + \lambda \sum_{i}^{N_{ch}} \left( \sum_{k}^{N_{slot,i}} k y_{i,k} - \sum_{j}^{N_{seed}} w_j x_{i,j} \right)^2$$

$N_{slot,i}$ represents the number of slots in the i-th chamber. A first term on the right-hand side is 0 when a sum of the states of the additional elements ($Y_{i,k}$) is exactly 1 for each chamber, and is a value larger than 0 in other cases. A second term on the right-hand side is necessary to match states of the element $E_j$) and the additional element ($Y_{i,k}$), and it is 0 when a sum of the states of $X_{i,j}$ and a product of the state of $Y_{i,k}$ and the number of slots k are the same for each chamber and is a value larger than 0 in other cases.

$w_j$ is the number of slots used for the j-th deposition species. In a case in which film deposition is performed, when only one slot is used, w of the deposition species in the film deposition is set to 1. "A case in which a deposition species uses a plurality of slots" may refer to, for example, a case in which a plurality of types of materials are sputtered at the same time to deposit a predetermined film.

In a case in which simultaneous film deposition is performed from a plurality of deposition species when a certain layer is deposited, the deposition species to be simultaneously deposited need to be disposed in the same film deposition chamber 10. Therefore, a disposition of the deposition species that have a chance of being deposited simultaneously on a wafer in the same film deposition chamber is also one of the constraint conditions. In this case, the plurality of deposition species are regarded as one deposition species, and a value of w is set to the number of the deposition species. Simultaneous film deposition may be, for example, simultaneous sputtering.

When it is desired to improve throughputs of wafers having different film deposition processes at the same time, the above-described $H_t$ is designed for a process of each wafer, and a sum of them is used as a new $H_t$. For example, when it is desired to simultaneously improve throughputs of a wafer 1 and a wafer 2 having different film deposition processes, $H_t$ represented by the following expression may be used.

$$H_t = w_{t1}H_{t1} + w_{t2}H_{t2} \quad \text{[Math. 11]}$$

$H_{t1}$ and $H_{t2}$ are $H_t$ for wafer 1 and wafer 2. $w_{t1}$ and $w_{t2}$ are weights. It is possible to adjust so that weight of a wafer for which a throughput is desired to be preferentially improved is increased.

For example, an energy function when the above-described two constraint terms $H_A$ and $H_B$ are added is represented as follows.

$$H = H_t + H_A + H_B \quad \text{[Math. 12]}$$

Also, when a replacement work is performed at the end of a service life of the deposition species 1, the film deposition apparatus 100 is stopped during that period. It takes time for the replacement work of the deposition species 1. When the number of times the deposition species 1 is replaced is reduced, a production efficiency of the film deposition apparatus 100 increases. Constraint terms may be set so that times until the plurality of deposition species will reach the end of their service lives are substantially the same. The term "substantially the same" means that times of reaching the end of service lives are within a variation range of 10% with respect to a time of a specific deposition species 1 reaching the end of a service life.

For example, an order of wafer transfer may also be added as a constraint of the Ising model or the QUBO. When the order of wafer transfer is reflected in the calculation model, it is represented by adding an additional element ($Z_{m,t}$) to the calculation model. The additional element $Z_{m,t}$ is represented by a process m in the film deposition apparatus of the wafer and a time t at which the above-described process is executed. A process cycle in the film deposition apparatus of the wafer is a flow of film deposition and process processing from the wafer is loaded into a load lock chamber LL until it is finally transferred to the load lock chamber. A state $z_{m,t}$ of the additional element $Z_{m,t}$ is set to "1" when the process in is processed at the time t and is set to "0" in other cases.

The constraint may also be extended to an order of wafer transfer before and after the film deposition process in addition to the order of the wafer transfer in the film deposition apparatus of the wafer. The constraint may also be extended to an order of wafer transfer in a process of a single-wafer-processing type manufacturing apparatus, such as, for example, an etching apparatus, a resist coater, or the like.

Also, as a constraint of the Ising model or the QUBO, for example, loading a new wafer into the film deposition chamber in the middle may be added. When this is reflected in the calculation model, an additional element ($A_{t,w}$) is added to the calculation model. The additional element $A_{t,w}$ is represented by a timing t at which a wafer is loaded into the film deposition chamber and a loading position w of the wafer. A state $a_{t,w}$ of the element $A_{t,w}$ is set to "1" when a wafer w is loaded at the timing t and is set to "0" in other cases.

The calculation region 201 performs an annealer calculation from the designed calculation model. An annealer calculation is a calculation method for finding an optimum state by applying variations to a state x, y of the spin s of each element E. Disposition data (x) of the deposition species 1 in which H becomes smaller and a time (throughput) required for film deposition at that time are predicted by the annealer calculation.

The annealer calculation can be calculated by a calculation method such as simulated annealing, an evolutionary algorithm, a tabu search, or the like.

The annealer calculation can be executed by a dedicated machine (annealing machine) specialized for the Ising model or the QUBO calculation. For example, Quantum annealing machine (D-wave, NEC), Coherent Ising machine (NTT), Simulated bifurcation machine (Toshiba), Digital annealer (Fujitsu), CMOS annealer (Hitachi), or the like can be applied.

A quantum gate type computer may be used for the annealer calculation. For example, when a quantum approximate optimization algorithm (QAQA) is used, the Ising model and the QUBO can be calculated by the quantum gate type computer.

Figure 5:
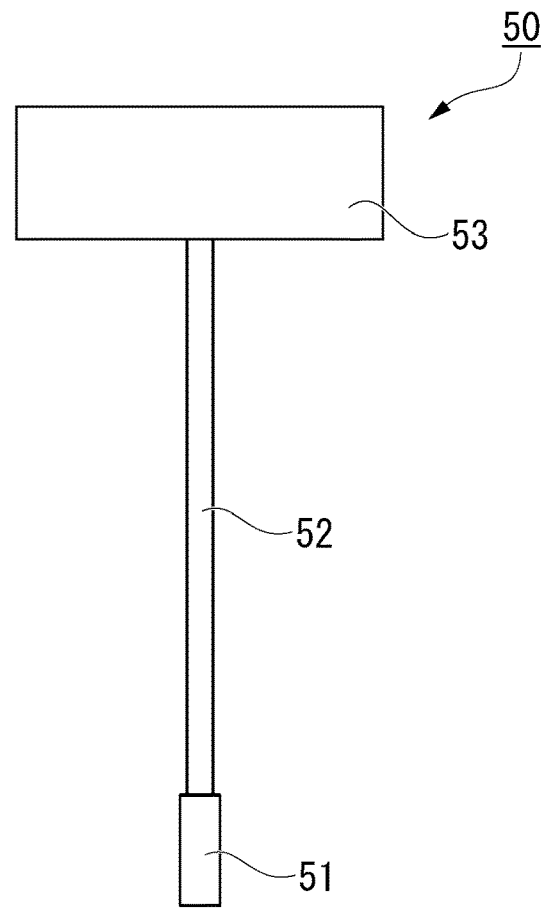
FIG. 5 is a schematic view of an arithmetic element that performs an annealer calculation in a calculation region.

FIG. 5 is a schematic view of an arithmetic element 50 that performs an annealer calculation in the calculation region 201. The arithmetic element 50 includes an arithmetic unit 51, a communication unit 52, and a control unit 53.

The arithmetic unit 51 is a portion that performs the above-described annealer calculation. The arithmetic unit 51 includes a quantum computer. A quantum computer is a generic name including computers of an annealer calculation and a quantum gate type. The quantum computer may include, for example, an optical element, a superconducting element, and the like. An arithmetic operation of the quantum computer may be performed by, for example, the optical element, the superconducting element, or the like.

An arithmetic operation by the optical element can be performed at room temperature. On the other hand, an optical fiber over a kilometer is necessary to be operated at high speed, and there are technical problems such as reduction in size, high-speed arithmetic operation, and generation of squeezed light. An arithmetic operation by the superconducting element requires an ultra-low temperature technology of about 20 millikelvin to reduce noise.

The communication unit 52 is responsible for communication between the arithmetic unit 51 and the control unit 53. Transmission of a signal in the communication unit 52 may be performed using, for example, a metal wiring or an optical wiring.

When the arithmetic unit 51 includes the superconducting element, transmission of a signal in the communication unit 52 is preferably performed using an optical wiring. This is because, when a metal wiring is used therefor, it is difficult to maintain an ultra-low temperature of the arithmetic unit 51 due to heat conduction between the arithmetic unit 51 in an ultra-low temperature environment and the control unit 53 in a room temperature environment.

When an optical wiring is used for transmission of a signal in the communication unit 52, a photoelectric conversion element that converts an optical signal into an electric signal is provided in the vicinity of the control unit 53. The photoelectric conversion element may be, for example, a spin photodetector.

Figure 6:
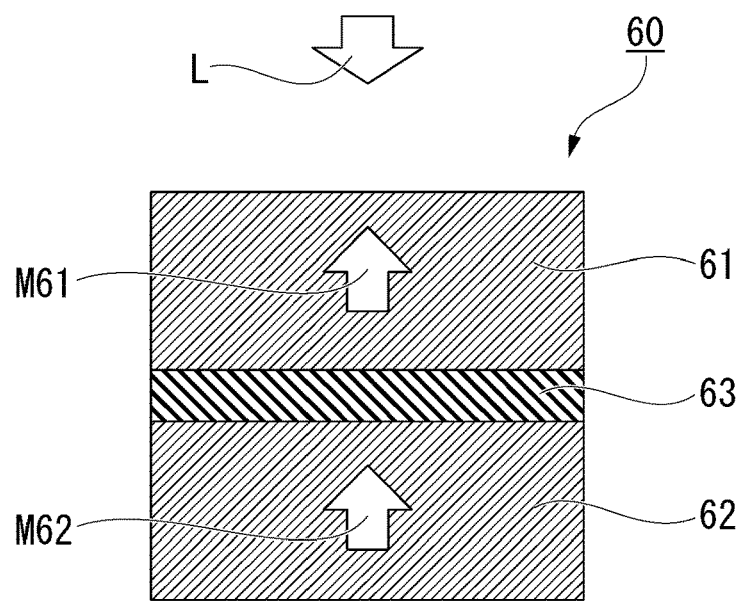
FIG. 6 is a schematic view of a spin photodetector.

FIG. 6 is a schematic view of a spin photodetector. A spin photodetector 60 includes a magnetization free layer 61, a magnetization fixed layer 62, and a non-magnetic layer 63 sandwiched therebetween. The magnetization free layer 61 and the magnetization fixed layer 62 contain a ferromagnetic material. A magnetization M61 of the magnetization free layer 61 is more easily reversed than a magnetization M62 of the magnetization fixed layer 62. When an intensity of light L irradiated to the magnetization free layer M61 changes, the magnetization of the magnetization free layer 61 is inclined. The light L irradiated to the magnetization free layer M61 may be, for example, circularly polarized light.

When a relative angle between the magnetization M61 of the magnetization free layer 61 and the magnetization M62 of the magnetization fixed layer 62 changes, a resistance value in a lamination direction of the spin photodetector 60 changes. That is, the spin photodetector 60 can convert change in intensity of the light L into an electric signal, that is, a resistance value of the spin photodetector 60. For example, when an intensity of the light L is changed at high speed to change a magnetization direction of the magnetization free layer 61 at high speed, the spin photodetector 60 can generate a high frequency signal.

The magnetization free layer 61 may be, for example, made of a ferrimagnetic material. A ferrimagnetic material is a magnetic material that exhibits ferromagnetism as a whole, but a micro-magnetic structure thereof is in an antiferromagnetic state. Since there is a difference in magnetic moment between a magnetization oriented in a first direction and a magnetization oriented in a second direction opposite to the first direction in the micro-magnetic structure, ferromagnetic characteristics are exhibited as a whole. When the ferrimagnetic material is irradiated with a sufficient light energy from the outside, a combination of antiferromagnetic magnetic structure is reversed, and ferromagnetic properties exhibiting as a whole become an opposite direction.

The ferrimagnetic material may be, for example, an alloy of an element having 4f electrons in an outermost shell and an element having 3d, 4d, and 5d electrons in an outermost shell. The ferrimagnetic material may be, for example, GdCoFe or the like. The ferrimagnetic material may be an oxide such as a ferrite material. The ferrite material exhibits ferrimagnetism when an element having a different magnetic moment is combined as the 3d element.

The magnetization free layer 61 may have a laminated structure of a ferromagnetic layer and a ferrimagnetic layer made of a ferrimagnetic material. As the ferromagnetic layer, those generally used for magnetoresistance effect elements or the like can be applied. The ferromagnetic layer may be, for example, a simple substance metal of Co, Fe, or Ni, an alloy containing these, a Heusler alloy, or the like. A state of magnetization of the ferrimagnetic layer changes when it is irradiated with light. Magnetization of the ferromagnetic layer changes as the state of magnetization of the ferrimagnetic layer changes. The ferromagnetic layer is mainly responsible for resistance change associated with a magnetoresistance effect of the spin photodetector 60. The ferrimagnetic layer is mainly responsible for magnetization reversal of the spin photodetector 60 due to light. When functions of the ferromagnetic layer and the ferrimagnetic layer are divided, both a high-speed operation and a high output of the spin photodetector 60 can be achieved. The ferromagnetic layer is preferably on the non-magnetic layer 63 side with respect to the ferrimagnetic layer.

Also, a spin conduction layer may be inserted between the magnetization free layer and the ferrimagnetic layer. The spin conduction layer propagates a spin current generated during reversal of the ferrimagnetic material to the ferromagnetic layer. As a result, magnetization reversal of the ferromagnetic layer is induced. When the spin photodetector 60 has such a configuration, magnetization reversal on the order of femtoseconds is possible. As the spin conduction layer, one having high spin conduction characteristics can be used. As the spin conduction layer, for example, a metal such as copper or silver, a semiconductor such as silicon, germanium, or gallium arsenide, a two-dimensional substance such as graphene, or the like can be used.

The magnetization free layer 61 may be, for example, made of a ferromagnetic material. Generally, a ferromagnetic material is used for the magnetization free layer 61 in magnetoresistance effect elements. However, in order to function as the spin photodetector 60, an optical signal incident thereon must be polarized. When the optical signal is unpolarized, the optical signal exhibits an effect of heating the ferromagnetic material. In this case, a magnetization direction of the ferromagnetic material cannot be arbitrarily directed by the optical signal. When the optical signal is polarized, a magnetization direction of the ferromagnetic material can be arbitrarily directed by the polarization of the optical signal. When the magnetization free layer 61 is made of a ferrimagnetic material, heating and cooling processes are required. When the magnetization free layer 61 is made of a ferromagnetic material, since the heating and cooling processes are not required, an optical signal can be converted into an electrical signal at higher speed than when it is made of a ferrimagnetic material.

The communication unit 52 transmits an arithmetic operation result of the arithmetic unit 51 to the control unit 53 as an optical signal, and the spin photodetector converts the optical signal into an electric signal.

The control unit 53 controls the arithmetic unit 51. The control unit 53 transmits a signal from the outside to the arithmetic unit 51 and transmits a signal from the arithmetic unit 51 to the outside. The control unit 53 may include, for example, a high-frequency measuring instrument, an oscillator, and the like. The control unit 53 transmits an arithmetic operation result of the arithmetic unit 51 to the film deposition apparatus 100.

A throughput can be improved by actually transposing a disposition of the deposition species 1 of the film deposition apparatus 100 on the basis of the disposition data (x) of the deposition species 1 predicted by the annealer calculation.

Second Embodiment

Figure 7:
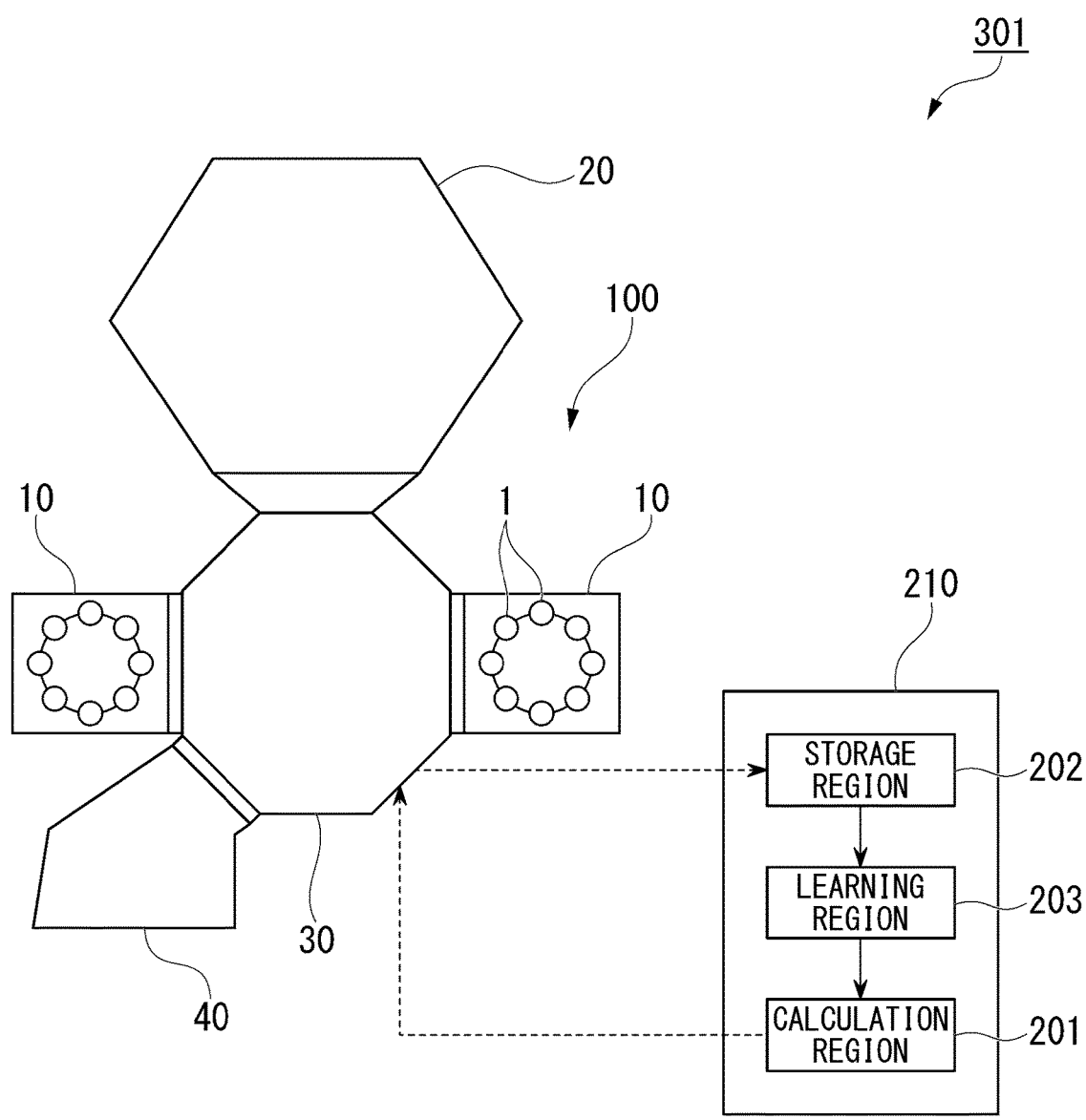
FIG. 7 is a schematic view of a film deposition system according to a second embodiment.

A film deposition system according to a second embodiment is different from the first embodiment in that an interaction parameter Q is obtained using machine learning. FIG. 7 is a schematic view of a film deposition system 301 according to the second embodiment. The film deposition system 301 includes a film deposition apparatus 100 and a computer 210.

The computer 210 includes a storage region 202, a learning region 203, and a calculation region 201.

The storage region 202 stores a time required for film deposition as teacher data when a disposition of a deposition species 1 in the film deposition apparatus 100 is disposed in a specific disposition. The "disposition of a deposition species 1" means which material of the deposition species 1 is disposed in which film deposition chamber. A time (throughput) required for film deposition when the deposition species 1 is disposed in a specific disposition is based on, for example, actual measurement. A throughput for each disposition of the deposition species 1 is obtained by an experiment and is acquired in the storage region 202 as the teacher data. As the number of pieces of the teacher data becomes larger, the accuracy of a calculation model to be described later becomes higher.

The learning region 203 determines interaction parameters between elements by machine learning based on the teacher data and designs a calculation model. Hereinafter, a design method of the calculation model will be described by taking a case in which QUBO is applied to the calculation model as an example.

Figure 8:
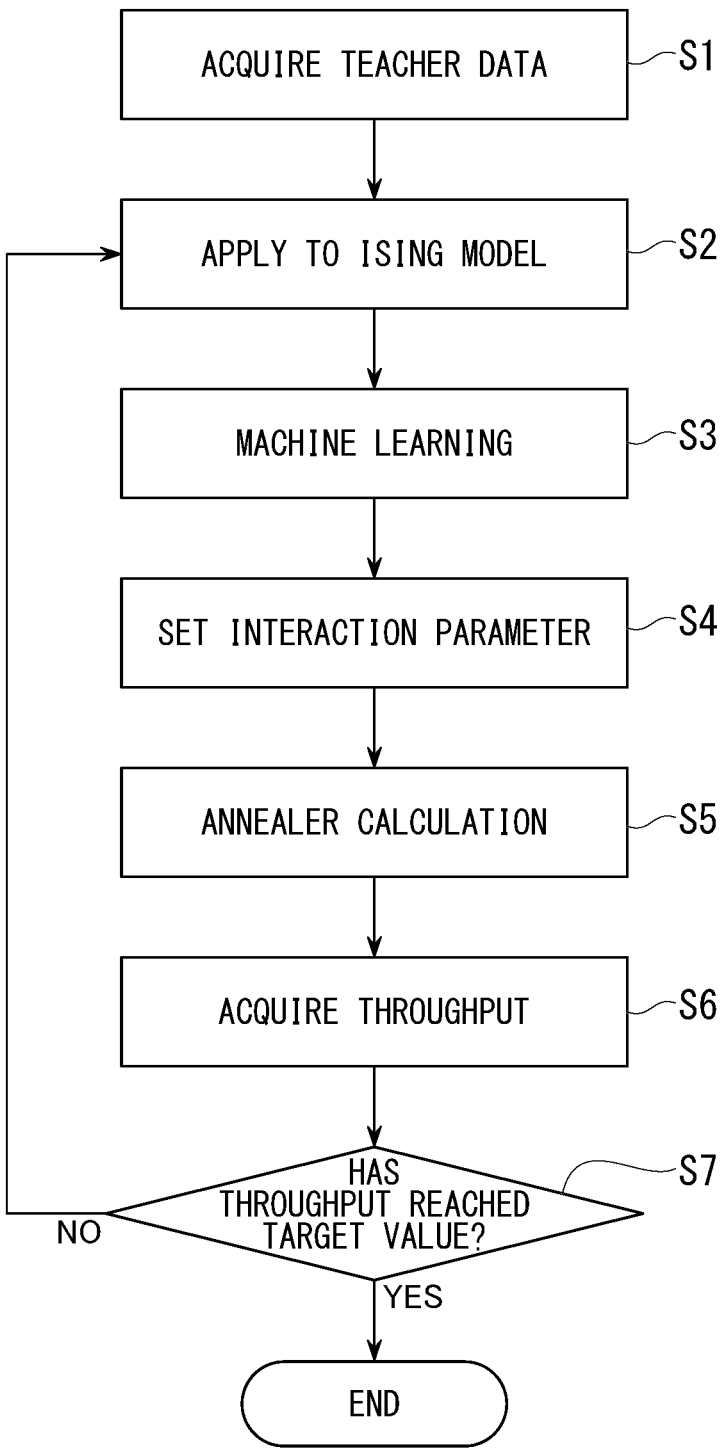
FIG. 8 is a flowchart of a design method of a calculation model.

FIG. 8 is a flowchart of a design method of a calculation model. First, the learning region 203 acquires teacher data from the storage region 202 (first step S1). The teacher data can be obtained by actual measurement or simulation. In a case of the actual measurement, film deposition processing is performed with a plurality of disposition patterns of the deposition species 1, and experimental results of throughputs at that time are used as the teacher data. In a case of the simulation also, simulations of film deposition processing are performed with a plurality of disposition patterns of the deposition species 1, and calculation results of throughputs at that time are used as the teacher data.

The disposition pattern of the deposition species 1 in the teacher data may be randomly selected, may be given with several disposition patterns that are expected to have significantly different throughputs to improve an accuracy of the machine learning, or may be a combination of patterns.

Next, the teacher data is applied to the QUBO (second step S2). A disposition of the deposition species 1 in the teacher data is converted into a state $(q_i, q_j)$ of a spin s in an element E of the QUBO.

Next, the learning region 203 applies a plurality of pieces of teacher data to the QUBO and performs machine learning (third step S3). When the number of pieces of teacher data is small, the machine learning may be performed using a factorization machine. The factorization machine is one type of machine learning model represented by the following expression.

$$y(x^{(S)}) = \sum_{i=1}^{N} w_i x_i + \sum_{i=1}^{N} \sum_{j=1}^{N} \sum_{k=1}^{K} v_{ik} v_{jk} x_i x_j \quad [\text{Math. 13}]$$

w and v are fitting parameters obtained by machine learning and correspond to an interaction parameter (Q) of the QUBO. When K is increased, the number of fitting parameters varies and K is appropriately adjusted according to complexity of the problem.

When machine learning is performed, the interaction parameter (Q) based on the teacher data is determined (fourth step S4).

When the interaction parameter (Q) is determined, a calculation model is determined. Here, constraints are added to the calculation model as necessary. The constraints may be, for example, those presented in the first embodiment. This calculation model is sent to the calculation region 201.

The calculation region 201 predicts a time required for film deposition when a new disposition of the deposition species 1 is set on the basis of the designed calculation model.

First, the calculation region 201 performs an annealer calculation from the designed interaction parameter (Q) (fifth step S5). Disposition data (x) of the deposition species 1 in which H becomes smaller is output by the annealer calculation.

Next, a throughput of the disposition of the deposition species 1 obtained by the calculation region 201 is acquired (sixth step S6). The throughput can be obtained from actual measurements or simulations. For example, in a case of actual measurement, a throughput is obtained by performing a film deposition experiment by changing a disposition of the deposition species 1 to that obtained by the calculation region 201. In a case of simulation, a throughput is calculated by simulating film deposition processing with the disposition of the deposition species 1 obtained by the calculation region 201.

Next, it is determined whether or not the acquired throughput has reached a target value (seventh step S7). When the throughput has reached the target value or less, the computer 200 outputs the value. If it were a disposition of the deposition species 1 used in the calculation, a time required for film deposition can be sufficiently reduced. On the other hand, when the throughput has not reached the target value or less, the result is sent to the storage region 202 and is acquired as teacher data again. Then, the above-described process is repeated until the throughput reaches the target value or less.

Then, when the disposition of the deposition species 1 in the film deposition apparatus 100 is determined, film deposition on a wafer is performed. A multilayer film to be deposited may be, for example, a magnetoresistance effect element. The magnetoresistance effect element includes at least two ferromagnetic layers and a non-magnetic layer sandwiched therebetween. The ferromagnetic layers each have a multilayer structure in many cases. The non-magnetic layer may be a conductor, a semiconductor, or an insulator, and may be, for example, an oxide film or a nitride film.

Although embodiments of the present invention have been described in detail with reference to the drawings, configurations, combinations thereof, or the like in the respective embodiments are examples, and additions, omissions, substitutions, and other changes to the configurations can be made within a scope not departing from the gist of the present invention.

Third Embodiment

Figure 9:
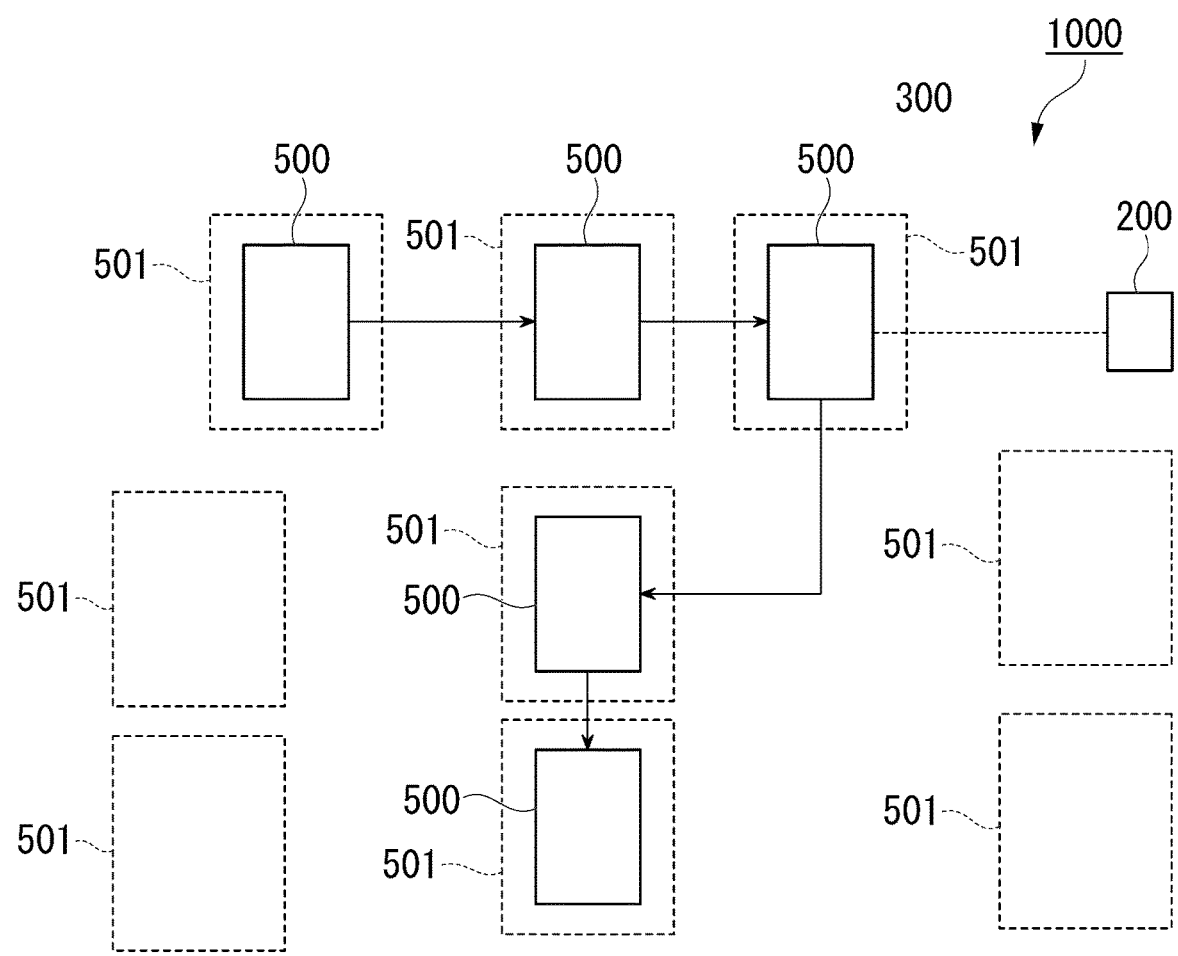
FIG. 9 is a schematic view of a factory system according to a third embodiment.

A factory system according to a third embodiment is an extension of the film deposition system according to the first embodiment to the factory system of an entire factory. FIG. 9 is a schematic view of a factory system according to the third embodiment. A factory system 1000 includes a computer 200 and a plurality of apparatuses 500. In the factory, there are a plurality of installable regions 501 in which the apparatuses 500 can be installed.

When the apparatuses 500 are intended to allocate to the apparatus installable regions 501 to reduce a transfer time between the apparatuses 500 and improve a throughput, as the number of apparatuses 500 and the number of apparatus installable regions 501 increase, combinations thereof increase significantly. Therefore, when the deposition species 1 in the first embodiment are made to correspond to the apparatuses 500 and the chambers 10 are made to correspond to the apparatus installable regions 501, the computer 200 can calculate an optimum disposition of the apparatuses 500 to the apparatus installable regions 501 in the same calculation flow as in the first embodiment and can improve the throughput. The number of slots in the chamber 10 may be made to correspond to the number of installable apparatuses 500 in each apparatus installable region 501.

According to the factory system according to the present embodiment, a throughput of the entire factory can be improved.

Example 1

In example 1, a time required for film deposition was obtained when a disposition of deposition species was set using the film deposition system 300 illustrated in FIG. 1.

A film deposition apparatus of example 1 includes three chambers ch-A, ch-B, and ch-C, and a transfer chamber. Wafers can be transferred between the three chambers via the transfer chamber. ch-A and ch-B are each equipped with eight slots in which arbitrary deposition species can be disposed. ch-C is a chamber that performs a process other than film deposition, and deposition species cannot be disposed therein.

There are six types of deposition specifies as follows. One slot is used for deposition species a, b, c, d, and e. Deposition species f uses four slots. That is, film deposition processing with the deposition species f performs simultaneous sputtering from the four slots.

TABLE 1

| Deposition species | Number of slots |
|---|---|
| a | 1 |
| b | 1 |
| c | 1 |
| d | 1 |
| e | 1 |
| f | 4 |

Figure 10:
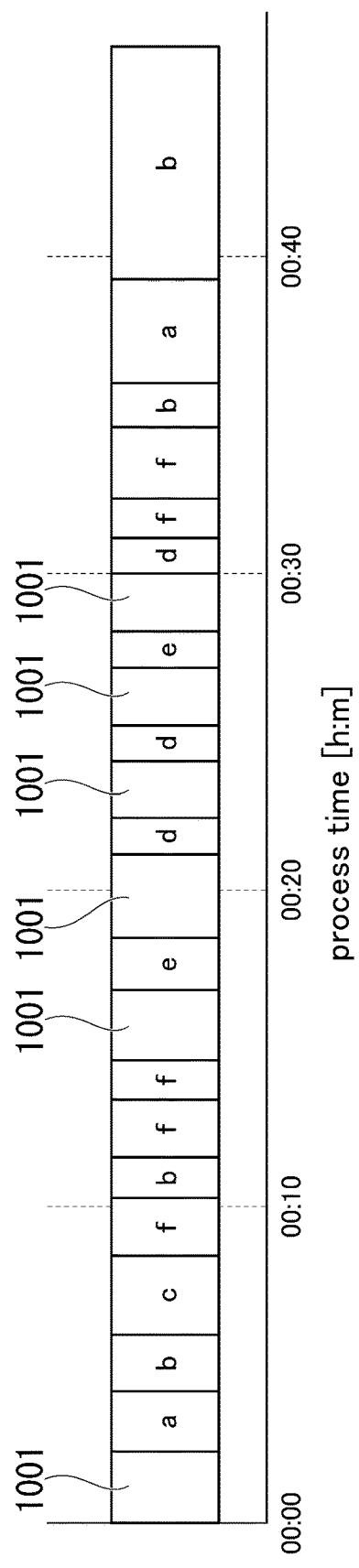
FIG. 10 is a time chart showing the entire process of a film deposition apparatus in example 1 and comparative example 1.

A wafer is loaded into the load lock chamber LL (see FIGS. 1 and 11), then is subjected to processes shown in the time-series chart of FIG. 10 below from the left to the right, and is finally transferred to the load lock chamber LL. The entire process cycle in the film deposition apparatus is the above-described processes. Each block in FIG. 10 represents a process, and of the blocks, those with an alphabet described therein indicate film deposition processes, and each alphabet thereof indicates a deposition species used for the film deposition. The film deposition process is executed in ch-A or ch-B. On the other hand, a block 1001 is a process other than film deposition and is executed in ch-C. A processing time of each process was represented as a width of each block in FIG. 10 from actual measurement.

A transfer time between each chamber or between each chamber and the load lock chamber LL was a value in the table below (unit: seconds) from actual measurement.

TABLE 2

| | | Transfer destination chamber | | | |
|---|---|---|---|---|---|
| | | A | B | C | LL |
| Transfer origin chamber | A | 0 | 13 | 55 | 44 |
| | B | 115 | 0 | 131 | 150 |
| | C | 46 | 105 | 0 | 44 |
| | LL | 44 | 44 | 44 | 0 |

Next, an optimum disposition was obtained according to the calculation flow shown in the first embodiment. $H_A$ and $H_B$ were added to the energy function as a constraint, and 2=2000. An annealer calculation was performed by simulated annealing.

A disposition of the following table was output by the annealer calculation. A time taken for the annealer calculation was 26 seconds.

TABLE 3

| Slot | A | B |
|---|---|---|
| 1 | a | c |
| 2 | b | |
| 3 | d | |
| 4 | e | |
| 5 | f | |
| 6 | | |
| 7 | | |
| 8 | | |

Figure 11:
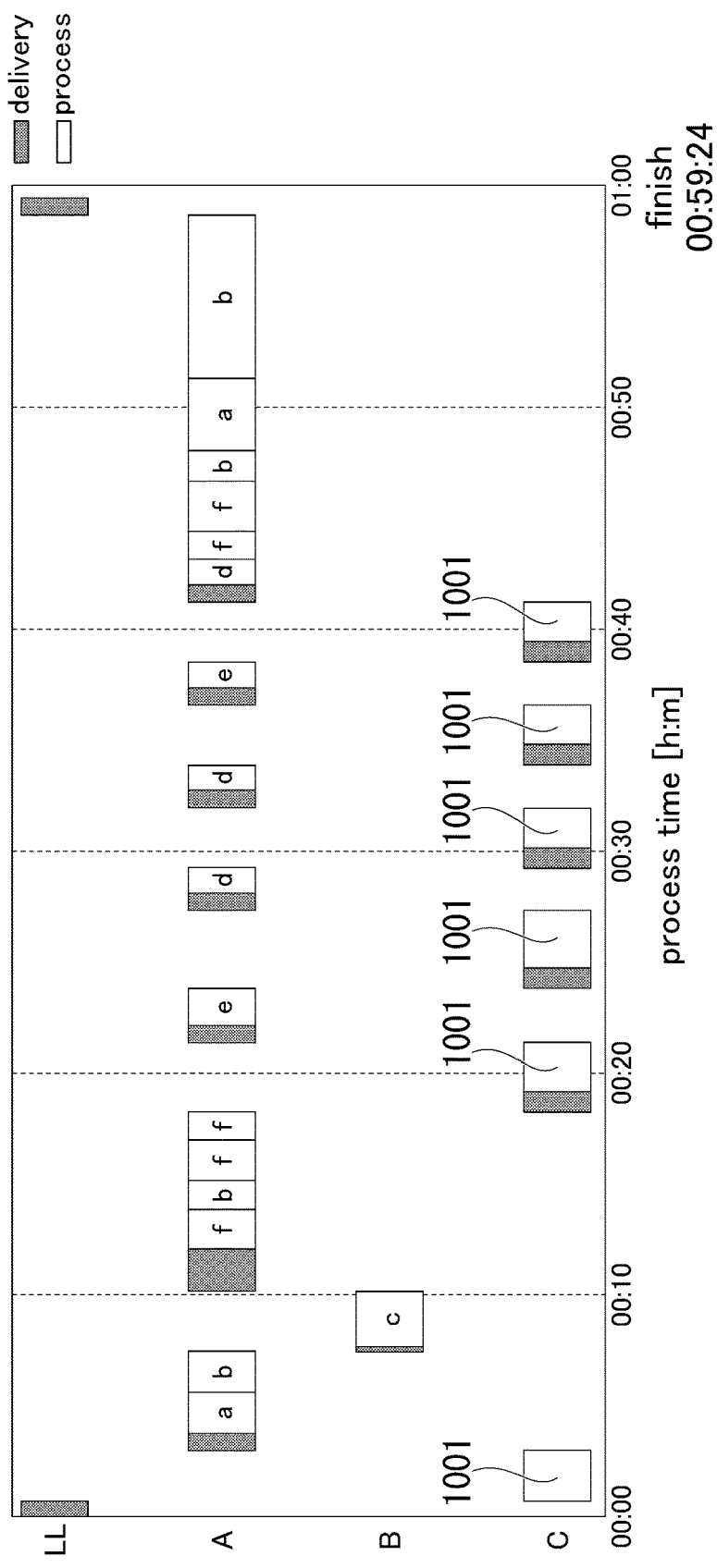
FIG. 11 is a Gantt chart showing a result of a throughput in example 1.

A throughput with the disposition of the above-described deposition species was obtained by simulation. As a result, a time of the whole process cycle was 59 minutes and 24 seconds. FIG. 11 is a time-series chart (Gantt chart) of example 1 divided for each chamber.

Comparative Example 1

In comparative example 1, each deposition species was randomly disposed. Deposition species a, b, c, d, e, and f were randomly disposed in ch-A and ch-B as shown in the Table below not to exceed an upper limit of the number of slots in each chamber.

TABLE 4

| Slot | A | B |
|---|---|---|
| 1 | b | a |
| 2 | c | f |
| 3 | d | |
| 4 | e | |
| 5 | | |
| 6 | | |
| 7 | | |
| 8 | | |

Figure 12:
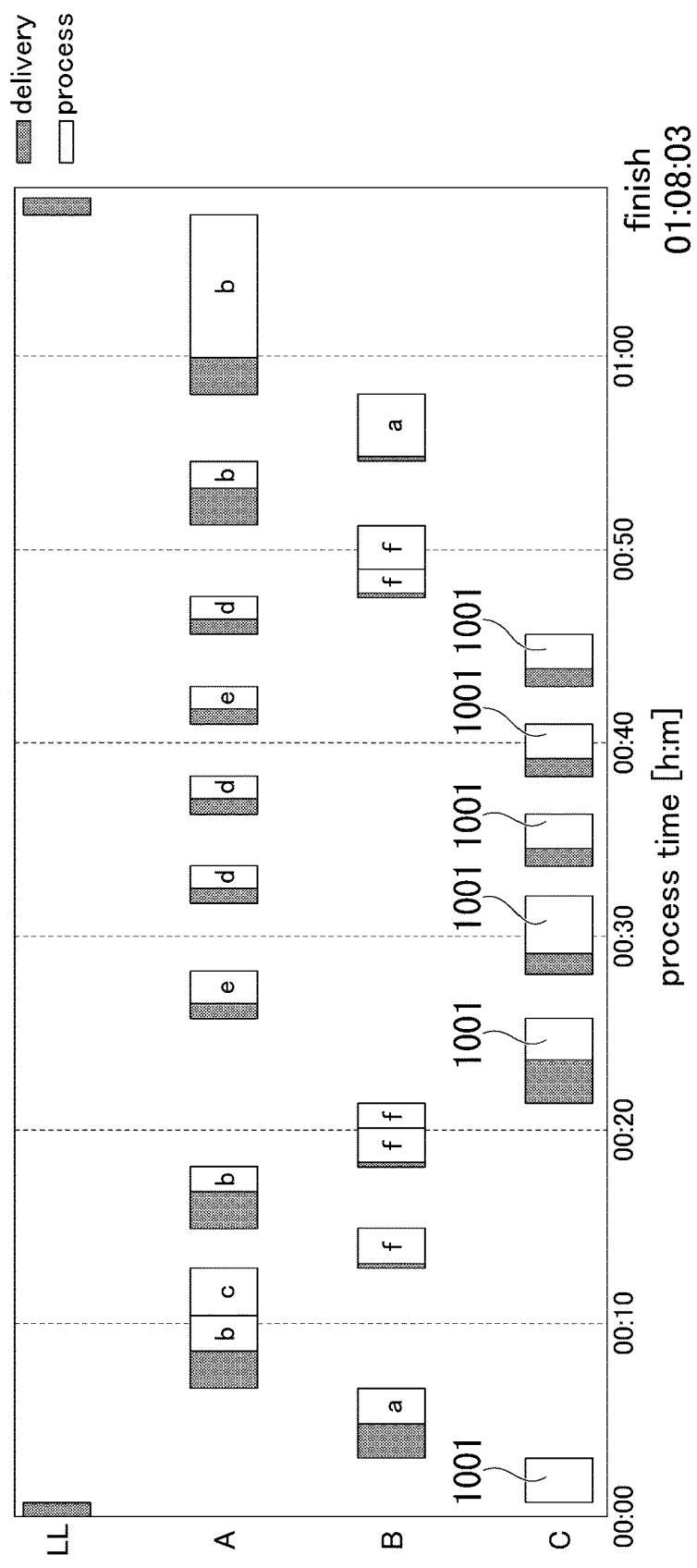
FIG. 12 is a Gantt chart showing a result of a throughput in comparative example 1.

When a throughput with the above-described disposition was obtained by simulation, it was 1 hour 8 minutes 3 seconds. FIG. 12 is a time-series chart (Gantt chart) of comparative example 1 divided for each chamber.

In example 1, the throughput was improved compared to that in comparative example 1. It is thought that this is because example 1 shown in FIG. 11 has a smaller number of times of transfer and a smaller transfer time than those in comparative example 1 shown in FIG. 12.

Example 2

Example 2 is an example in which the number of chambers and the number of deposition species are increased compared to those in example 1, and the number of combinations increased significantly. A film deposition apparatus of example 2 includes six chambers ch-A, ch-B, ch-C, ch-D, ch-E, and ch-F and a transfer chamber.

Wafers can be transferred via the transfer chamber. The number of slots in each chamber is shown in a table below.

TABLE 5

| Chamber | Number of slots |
| --- | --- |
| A | 5 |
| B | 5 |
| C | 5 |
| D | 5 |
| E | NA |
| F | NA | ch-A, ch-B, ch-C, and ch-D each have five slots, and arbitrary deposition species can be disposed. ch-E and ch-F are chambers that perform a process other than film deposition, and deposition species cannot be disposed.

From actual measurement, a transfer time between each chamber was uniformly 50 seconds, and a transfer time between the load lock chamber LL and each chamber was 44 seconds.

There are 13 types of deposition specifies a, b, c, d, e, f, g, h, i, j, k, l, and m, and the number of slots used is all 1.

Figure 13:
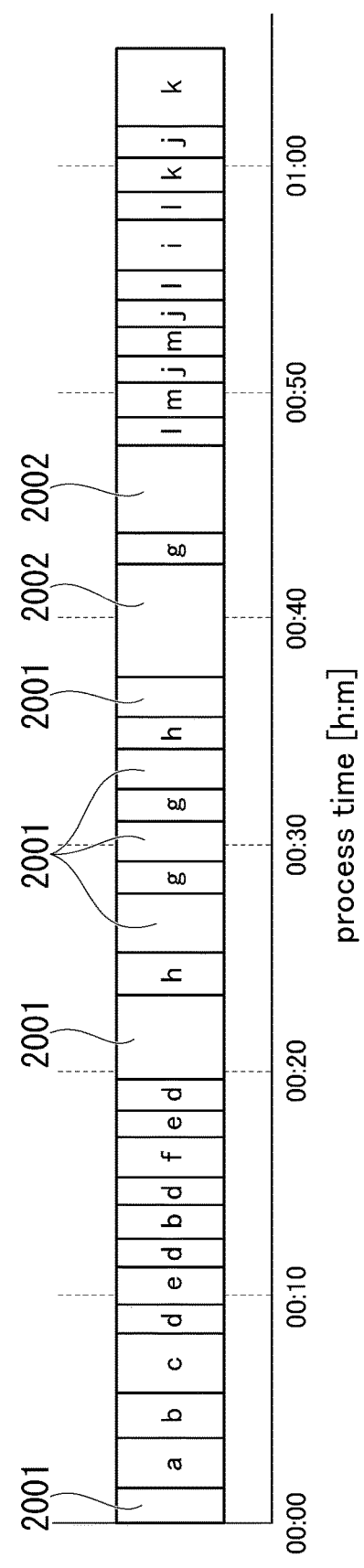
FIG. 13 is a time chart showing the entire process of a film deposition apparatus in example 2 and comparative example 2.

A wafer is loaded into the load lock chamber LL, then subjected to processes shown in the time-series chart of FIG. 13 from the left to the right, and finally transferred to the load lock chamber. The entire process cycle in the film deposition apparatus is the above-described processes. Each block in FIG. 13 represents a process. Of the blocks, those with an alphabet described therein indicate film deposition processes, and each alphabet thereof indicates a deposition species used for the film deposition. The film deposition process is executed in ch-A, ch-B, ch-C, or ch-D. On the other hand, a block 2001 and a block 2002 are processes other than film deposition, the block 2001 is executed in ch-E, and the block 2002 is executed in ch-F. A processing time of each process was represented as a width of each block in FIG. 13 from actual measurement.

An optimum disposition was obtained according to the calculation flow of the first embodiment. $H_A$ and $H_B$ were added to the energy function as a constraint, and $\lambda=2000$. An annealer calculation was performed by simulated annealing.

A disposition of the following table was output by the annealer calculation. A time taken for the annealer calculation was 54 seconds.

TABLE 6

|   | A | B | C | D |
| --- | --- | --- | --- | --- |
| 1 |   | b | a | i |
| 2 |   | c | g | j |
| 3 |   | d | h | k |
| 4 |   | e |   | l |
| 5 |   | f |   | m |

Figure 14:
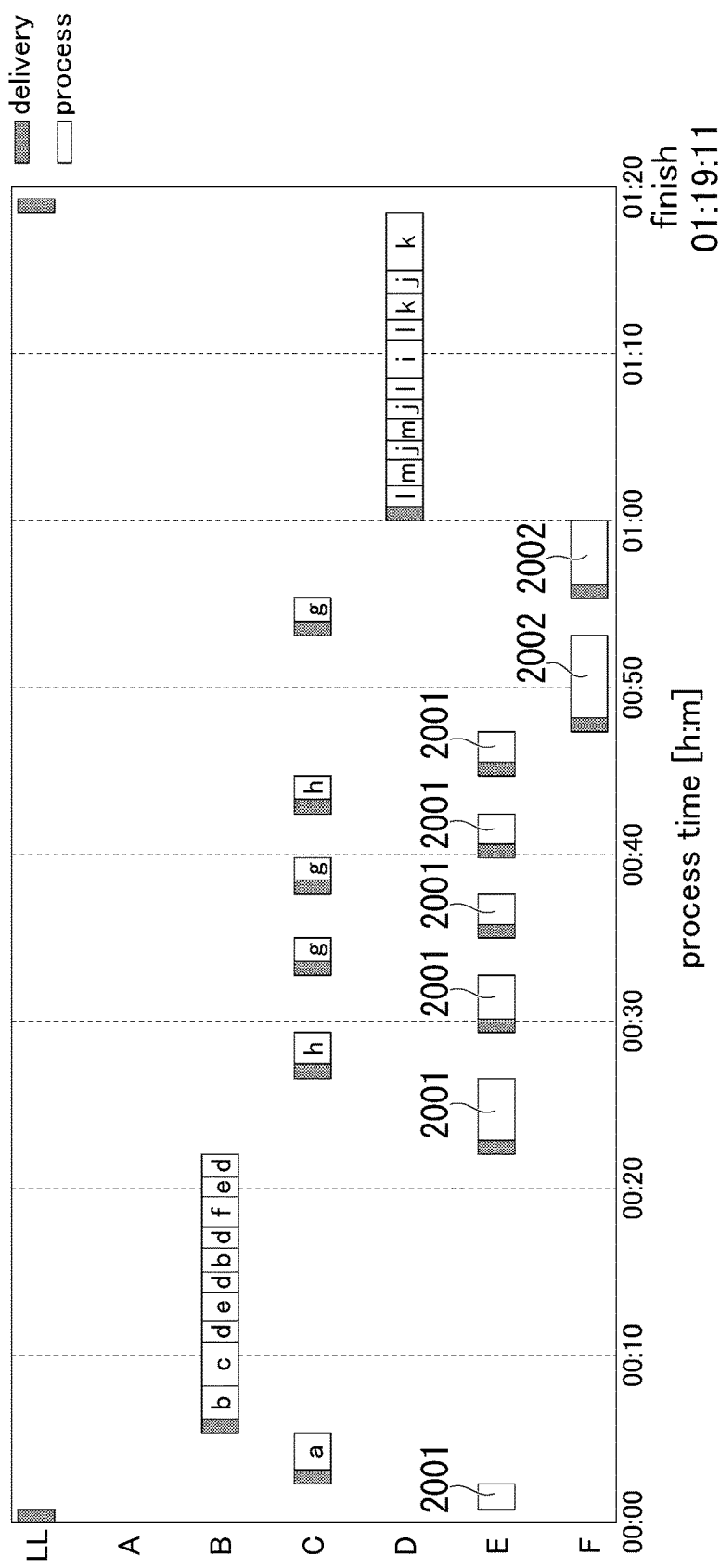
FIG. 14 is a Gantt chart showing a result of a throughput in example 2.

When a throughput with the above-described disposition was obtained by simulation, it was 1 hour 19 minutes 11 seconds. FIG. 14 is a time-series chart (Gantt chart) of example 2 divided for each chamber.

Comparative Example 2

In comparative example 2, each deposition species was randomly disposed. Deposition species a, b, c, d, e, f, g, h, i, j, k, l, and m were randomly disposed in ch-A, ch-B, ch-C, and ch-D as shown in Table 7 below not to exceed an upper limit of the number of slots in each chamber.

TABLE 7

|   | A | B | C | D |
| --- | --- | --- | --- | --- |
| 1 | c | a | b | k |
| 2 | d | e | i | l |
| 3 | f |   | j | m |
| 4 | g |   |   |   |
| 5 | h |   |   |   |

Figure 15:
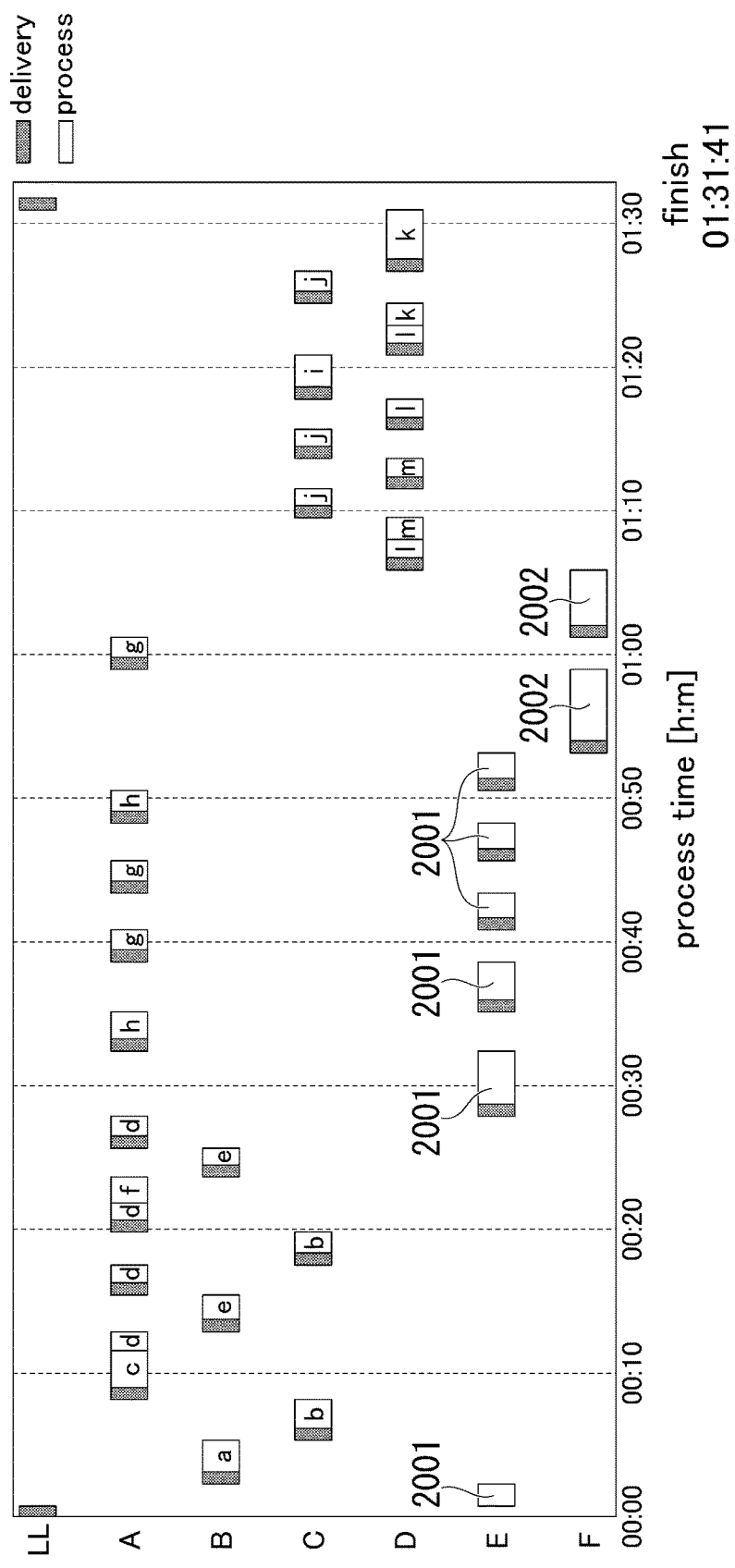
FIG. 15 is a Gantt chart showing a result of a throughput in comparative example 2.

When a throughput with the above-described disposition was obtained by simulation, it was 1 hour 31 minutes 41 seconds. FIG. 15 is a time-series chart (Gantt chart) of comparative example 2 divided for each chamber.

In example 2, the throughput was improved compared to that in comparative example 2. It is thought that this is because example 2 shown in FIG. 14 has a smaller number of times of transfer than that in comparative example 2 shown in FIG. 15.

Example 3

Example 3 is an example in which the number of chambers is further increased compared to that in example 2, and the number of combinations increased significantly. A film deposition apparatus of example 3 includes eight chambers ch-A, ch-B, ch-C, chD, chE, chF, chG, and ch-H, and a transfer chamber. Wafers can be transferred via the transfer chamber. The number of slots in each chamber is shown in a table below.

TABLE 8

| Chamber | Number of slots |
| --- | --- |
| A | 5 |
| B | 5 |
| C | 5 |
| D | 5 |
| E | 5 |
| F | 5 |
| G | 5 |
| H | NA |

Each of ch-A, ch-B, ch-C, chD, chE, chF, and chG has five slots, and arbitrary deposition species can be disposed therein. ch-H is a chamber that performs a process other than film deposition, and deposition species cannot be disposed.

From actual measurement, a transfer time between each chamber was uniformly 50 seconds, and a transfer time between the load lock chamber LL and each chamber was 44 seconds.

There are 35 types of deposition species, and the number of slots used is all 1.

Figure 16:
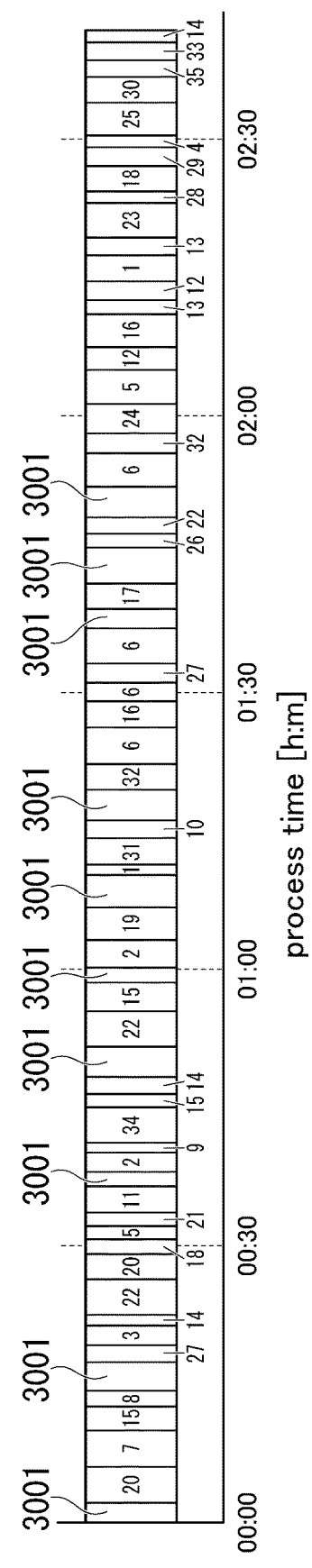
FIG. 16 is a time chart showing the entire process of a film deposition apparatus in example 3 and comparative example 3.

A wafer is loaded into the load lock chamber LL, then subjected to processes shown in the time-series chart of FIG. 16 from the left to the right, and finally transferred to the load lock chamber. The entire process cycle in the film deposition apparatus is the above-described processes. Each block in FIG. 16 represents a process. Of the blocks, those with a number described therein indicate film deposition processes, and each number thereof indicates a deposition species used for film deposition. The film deposition process is executed in ch-A, ch-B, ch-C, chD, ch-E, ch-F, or ch-G. On the other hand, a block 3001 is a process other than film deposition, and is executed in ch-H. A processing time of each process was represented as a width of each block in FIG. 16 from actual measurement.

An optimum disposition was obtained according to the calculation flow of the first embodiment. $H_A$ and $H_B$ were added to the energy function as a constraint, and 2=4000. An annealer calculation was performed by a simulated bifurcation machine.

A disposition of the following table was output by the annealer calculation. A time taken for the annealer calculation was 231 seconds.

TABLE 9

|   | A  | B  | C  | D  | E  | F  | G  |
|---|----|----|----|----|----|----|----|
| 1 | 7  | 3  | 2  | 5  | 1  | 6  | 4  |
| 2 | 8  | 14 | 9  | 11 | 10 | 16 | 25 |
| 3 | 15 | 17 | 19 | 12 | 23 | 24 | 30 |
| 4 | 18 | 22 | 29 | 13 | 28 | 27 | 33 |
| 5 | 20 | 26 | 34 | 21 | 31 | 32 | 35 |

Figure 17:
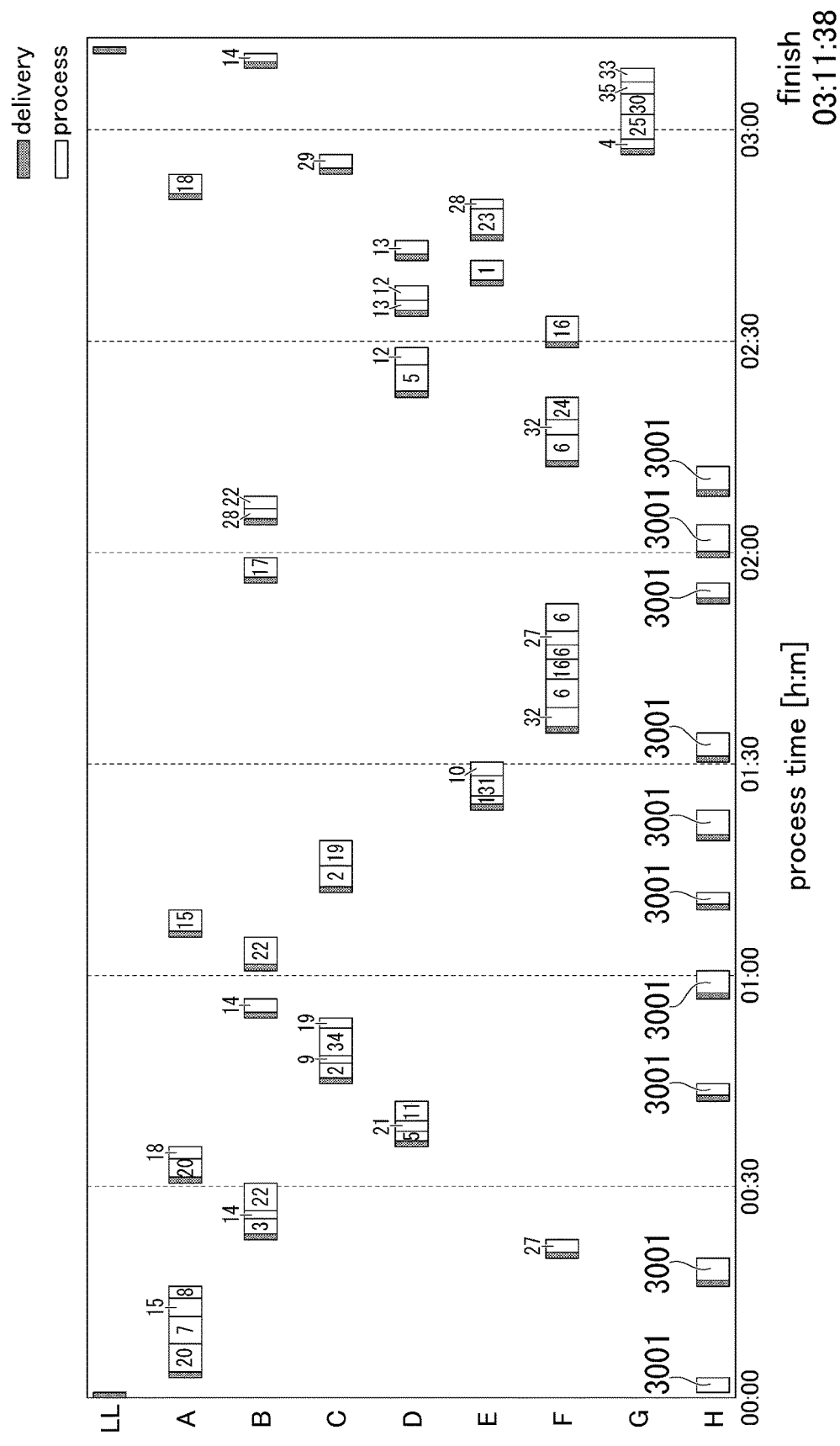
FIG. 17 is a Gantt chart showing a result of a throughput in example 3.

When a throughput with the above-described disposition was obtained by simulation, it was 3 hour 11 minutes 38 seconds. FIG. 17 is a time-series chart (Gantt chart) of example 3 divided for each chamber.

Comparative Example 3

In Comparative example 3, each deposition species was randomly disposed. 35 types of deposition species were randomly disposed in ch-A, ch-B, ch-C, ch-D, ch-E, ch-F, and ch-G as shown in Table 10 below so as not to exceed an upper limit of the number of slots in each chamber.

TABLE 10

|   | A  | B  | C  | D  | E  | F  | G  |
|---|----|----|----|----|----|----|----|
| 1 | 2  | 18 | 1  | 4  | 8  | 5  | 13 |
| 2 | 11 | 20 | 3  | 7  | 12 | 6  | 14 |
| 3 | 19 | 21 | 10 | 9  | 16 | 25 | 23 |
| 4 | 24 | 22 | 27 | 15 | 17 | 33 | 25 |
| 5 | 30 | 26 | 28 | 29 | 31 | 34 | 32 |

Figure 18:
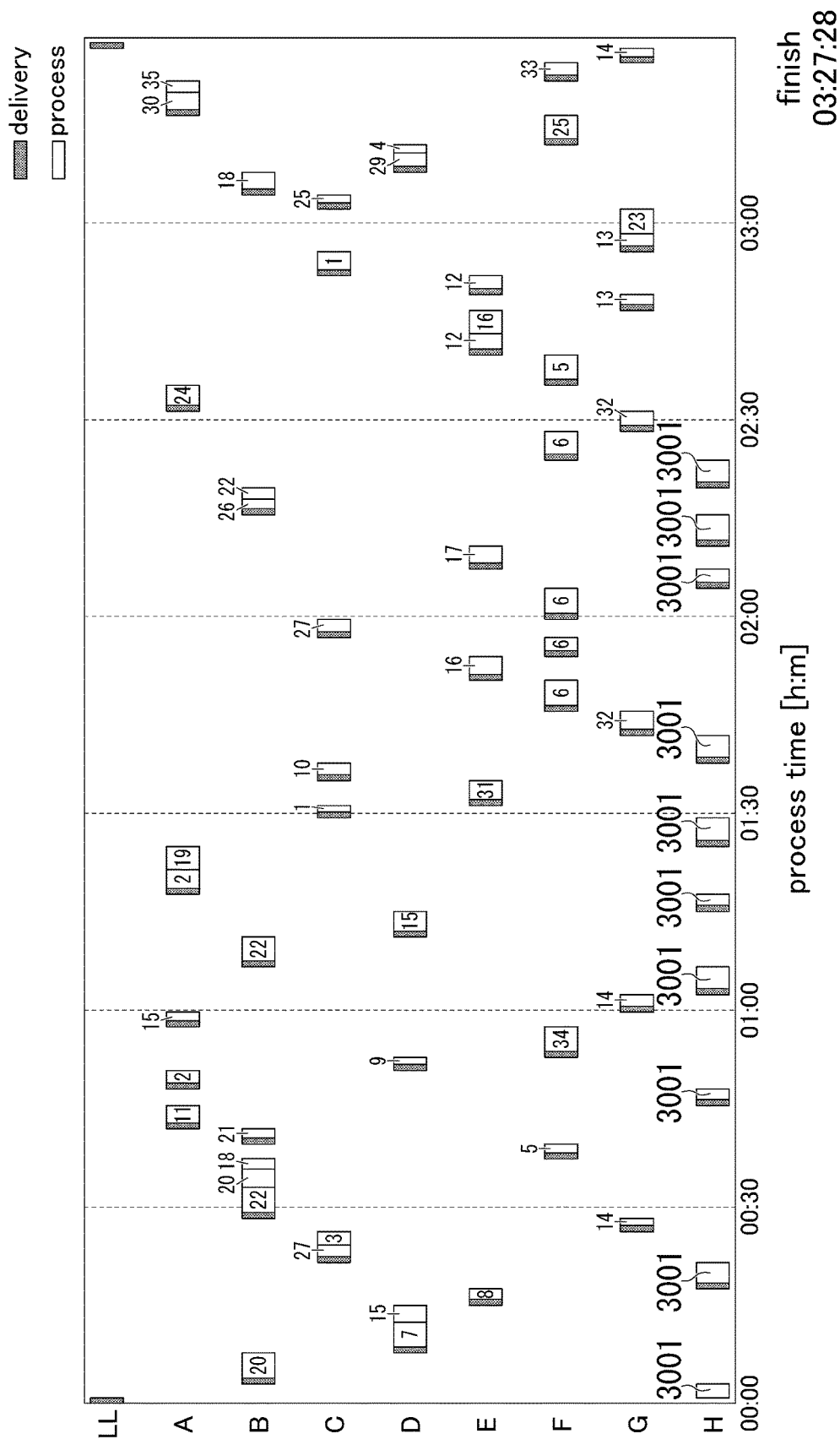
FIG. 18 is a Gantt chart showing a result of a throughput in comparative example 3.

When a throughput with the above-described disposition was obtained by simulation, it was 3 hours 27 minutes 28 seconds. FIG. 18 is a time-series chart (Gantt chart) of comparative example 3 divided for each chamber.

In Example 3, the throughput was improved compared to that in comparative example 3. It is thought that this is because example 3 shown in FIG. 17 has a smaller number of times of transfer than that in comparative example 3 shown in FIG. 18.

A disposition of all the deposition species in example 3 and comparative Example 3 has about $2.88 \times 10^{25}$ types of combinations, and when an attempt is made to simulate throughputs with depositions of all the deposition species 1 in a brute force manner, since it will take more than 1000 days even if, for example, a supercomputer with a computing performance of 200 petaflops is used, it is not realistic to obtain a disposition that will improve the throughput in a brute force manner. On the other hand, since the annealer calculation can be performed in 231 seconds in this embodiment, it is possible to obtain a disposition that will improve the throughput in a short period of time.

Example 4

In Example 4, a throughput when two wafers were loaded into the film deposition apparatus at the same time and film deposition was performed in parallel was obtained.

A film deposition apparatus and processes of the wafers are the same as those in the second embodiment. A wafer 1 and a wafer 2 were subjected to processing of the same process, and a disposition of deposition species in the film deposition apparatus and a timing of loading each wafer into the film deposition apparatus were optimized according to the calculation flow (see FIG. 8) shown in the second embodiment.

An objective was to reduce a time from the start of loading a wafer to be loaded first until processing of the two wafers was finished, and a target value was set to 1 hour and 30 minutes.

First, 20 teacher data was collected. A disposition of deposition species and a timing of wafer loading were randomly selected, and throughput data was collected on the basis of actual measurement.

Next, machine learning was performed using the collected teacher data with a factorization machine. K of the factorization machine was set to 8. K of the factorization machine is a parameter adjusted according to complexity of the problem. w and v were obtained by the machine learning and converted into the interaction parameter (Q) of the QUBO, and a calculation model was determined.

Next, the calculation model was input to an annealing machine to perform an annealer calculation. A simulated bifurcation machine was used for the annealing machine. Disposition data (x) of the deposition species 1 was output according to the annealer calculation.

Next, an actual disposition of the film deposition apparatus and timing of wafer loading were set on the basis of the disposition data (x) of the deposition species 1, and a throughput was obtained by actual measurement.

The throughput obtained by actual measurement was added as the teacher data, and the above-described process was repeated.

Figure 19:
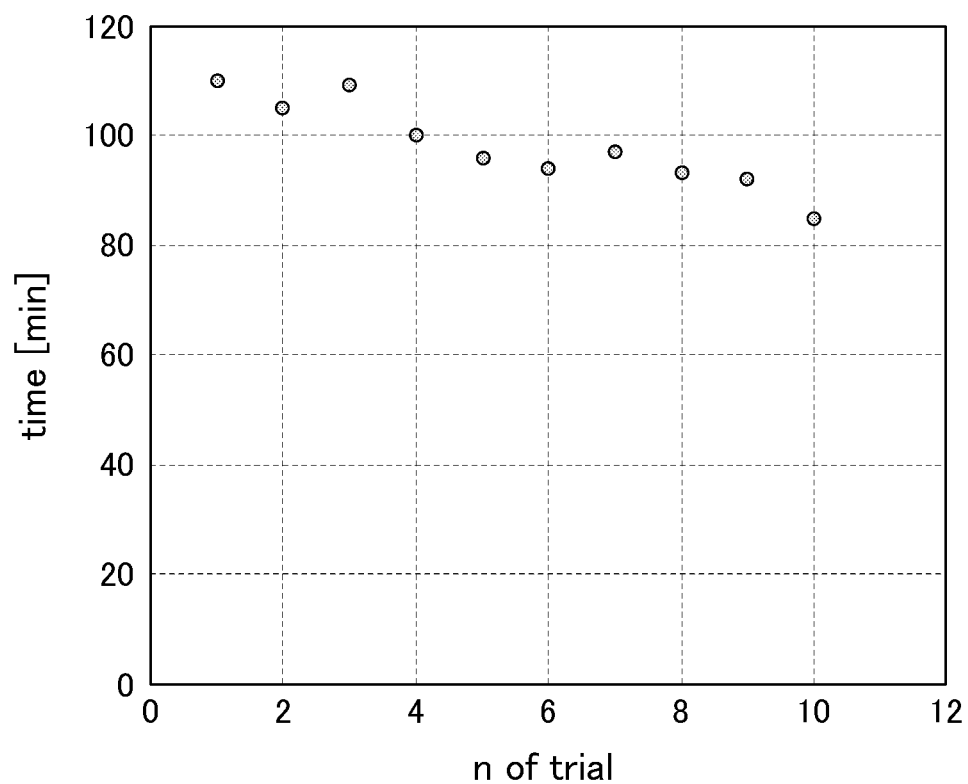
FIG. 19 is a view showing a result of a throughput in example 4.

FIG. 19 is a result of a throughput obtained by repeating the above-described process. When the above-described process was repeated, the time was gradually reduced and became the target value of 1 hour and 30 minutes or less at a 10th time of the repetition, and the throughput could be improved.

EXPLANATION OF REFERENCES

1 Deposition species
10 Film deposition chamber
20 Process chamber
30 Transfer chamber
40 Load lock chamber
100 Film deposition apparatus
200 Computer
201 Calculation region
202 Storage region
203 Learning region
300 Film deposition system
500 Apparatus
1000 Factory system
E Element
F Force
s Spin
1001, 2001, 2002, 3001 Block of process other than film deposition

What is claimed is:
1. A film deposition system comprising:
a film deposition apparatus including film deposition chambers in which a plurality of deposition species are respectively installable; and a computer configured to:
  calculate based on a calculation model having an Ising model or quadratic unconstrained binary optimization (QUBO); and
  predict a time required for film deposition when a disposition of the deposition species is set,
  wherein the Ising model or the QUBO has first elements of a number corresponding to a product of the number of the deposition species and the number of the film deposition chambers, and each of the first elements is a binary variable.

2. The film deposition system according to claim 1, wherein an energy function of the Ising model or the QUBO indicates a value corresponding to a throughput of the film deposition apparatus.

3. The film deposition system according to claim 1, wherein the Ising model or the QUBO has the first elements that interact with each other due to an interaction parameter, and the interaction parameter is determined from values corresponding to a transfer time of a wafer to be deposited on and a processing time in each process required to process the transferred wafer at a specific slot in one of the chambers.

4. The film deposition system according to claim 1, wherein the Ising model or the QUBO is represented by:

$$h_t(i) = \sum_{j=0}^{N_{ch}} \sum_{k=0}^{N_{ch}} \left(t\_deliver_{j,k} + t\_process_{stack_i}\right) \cdot x_{j,seed(stack_{i-1})} \cdot x_{k,seed(stack_i)}$$

when both an i-th process and an i−1-th process are film deposition with a deposition species that can be disposed in a different chamber, $$h_t(i) = \sum_{k=0}^{N_{ch}} \left(t\_deliver_{ch(stack_{i-1}),k} + t\_process_{stack_i}\right) \cdot x_{k,seed(stack_i)}$$

when the i-th process is film deposition with the deposition species that can be disposed in the different chamber, and the i−1-th process is film deposition with a deposition species that cannot be disposed in the different chamber, $$h_t(i) = \sum_{j=0}^{N_{ch}} \left(t\_deliver_{j,ch(stack_i)} + t\_process_{stack_i}\right) \cdot x_{j,seed(stack_{i-1})}$$

when the i-th process is film deposition with the deposition species that cannot be disposed in the different chamber, and the i−1-th process is film deposition with the deposition species that can be disposed in the different chamber, and $$h_t(i) = t\_deliver_{ch(stack_{i-1}),ch(stack_i)} + t\_process_{stack_i}$$

when both the i-th process and the i−1-th process are film deposition with the deposition species that cannot be disposed in the different chamber,
wherein $t\_deliver_{j,k}$ is a transfer time from a j-th chamber to a k-th chamber, and $t\_process_{stack_i}$ is a processing time of the i-th process, and wherein $h_t(i)$ is a value corresponding to a time required for film deposition in the i-th process, $N_{ch}$ is the number of film deposition chambers, and $x_{k,seed(stack_i)}$ is a state of one of the first elements defined as 1 when the deposition species for the i-th process is disposed in the k-th chamber and defined as 0 in other cases.

5. The film deposition system according to claim 4, wherein
  the film deposition apparatus further includes a process chamber which performs a process other than film deposition; and
  processing in the process chamber is defined as a process that is not replaceable with processing in another chamber in the Ising model or the QUBO.

6. The film deposition system according to claim 1, wherein
  the Ising model or the QUBO has a constraint; and
  the constraint reflects an upper limit of the number of deposition species of the same type among the deposition species.

7. The film deposition system according to claim 1, wherein
  the Ising model or the QUBO has a constraint; and
  the constraint reflects an upper limit of a number of slots of the deposition species in the film deposition chambers.

8. The film deposition system according to claim 7, wherein
  the Ising model or the QUBO further has second elements of a number corresponding to a sum of the number of slots in each film deposition chamber as the constraint, and
  the second elements are binary variables.

9. The film deposition system according to claim 1, wherein
  the Ising model or the QUBO has a constraint; and
  the constraint reflects a condition that deposition species that have a chance of being deposited simultaneously on a wafer are disposed in the same film deposition chamber.

10. The film deposition system according to claim 1, wherein
  the Ising model or the QUBO has a constraint; and
  the constraint reflects a condition that times until the plurality of deposition species will reach an end of their service lives are substantially the same.

11. The film deposition system according to claim 1, wherein
  the Ising model or the QUBO has a constraint; and
  the Ising model or the QUBO further has a third element representing a process cycle and a processing time for a process of a wafer as the constraint, and the element is a binary variables.

12. The film deposition system according to claim 1, wherein
  the Ising model or the QUBO has a constraint; and
  the Ising model or the QUBO further has a fourth element representing a loading time of a wafer to be loaded as the constraint, and the element is a binary variables.

13. The film deposition system according to claim 1, wherein
  the computer further includes a storage which stores a disposition of specific deposition species and a time required for film deposition in a case of the disposition of the specific deposition species as teacher data, and
  the computer is configured to determine an interaction parameter between the first elements of the Ising model or the QUBO by machine learning which is based on the teacher data and designs the calculation model.

14. The film deposition system according to claim 13, wherein the storage reacquires a disposition of the deposition species used for prediction and a time required for the predicted film deposition as the teacher data.

* * * * *